(12) United States Patent
Bae et al.

(10) Patent No.: US 10,643,545 B2
(45) Date of Patent: May 5, 2020

(54) METHOD AND APPARATUS FOR MERGING IMAGES BY ELECTRONIC DEVICE

(71) Applicant: Samsung Electronics Co., Ltd., Suwon-si, Gyeonggi-do (KR)

(72) Inventors: Jong Kon Bae, Seoul (KR); Yo Han Lee, Seoul (KR); Dong Hwy Kim, Hwaseong-si (KR); Seung Hoon Ko, Suwon-si (KR); Tae Sung Kim, Seongnam-si (KR); Dong Kyoon Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 15/336,271

(22) Filed: Oct. 27, 2016

(65) Prior Publication Data
US 2017/0116927 A1 Apr. 27, 2017

(30) Foreign Application Priority Data
Oct. 27, 2015 (KR) .................. 10-2015-0149697

(51) Int. Cl.
*G06F 9/451* (2018.01)
*G09G 3/3266* (2016.01)
(Continued)

(52) U.S. Cl.
CPC ........... *G09G 3/3266* (2013.01); *G06F 9/451* (2018.02); *G06T 11/60* (2013.01); *G09G 3/3677* (2013.01); *G09G 2320/0666* (2013.01)

(58) Field of Classification Search
CPC . G06F 9/451; G06T 11/00; G09G 2320/0666; G09G 3/3266; G09G 3/3677
See application file for complete search history.

(56) References Cited

U.S. PATENT DOCUMENTS 5,270,688 A * 12/1993 Dawson ................... G09G 5/08
345/639
5,838,336 A * 11/1998 Ross ........................ G09G 5/14
345/536

(Continued)

FOREIGN PATENT DOCUMENTS

CN 1791199 A 6/2006
CN 101097710 A 1/2008
(Continued)

OTHER PUBLICATIONS

Chinese Office Action dated Mar. 20, 2020, issued in a counterpart Chinese Application No. 201610958617.3.

*Primary Examiner* — Ram A Mistry
(74) *Attorney, Agent, or Firm* — Jefferson IP Law, LLP

(57) ABSTRACT

A method of operating an electronic device is provided. The method includes receiving, by a display driving circuit of the electronic device, main image data over a first channel from a first processor or a second processor of the electronic device, outputting, by the display driving circuit, a main image on a display panel of the electronic device based on the main image data, generating, by the display driving circuit, an additional image different from the main image, and merging, by the display driving circuit, the main image with the additional image and outputting, by the display driving circuit, the merged image on the display panel.

19 Claims, 22 Drawing Sheets

(51) Int. Cl.
*G06T 11/60* (2006.01)
*G09G 3/36* (2006.01)

(56) References Cited

U.S. PATENT DOCUMENTS

| | | | |
|---|---|---|---|
| 6,421,302 B1 | 7/2002 | Wimberly | |
| 6,556,513 B2 | 4/2003 | Wimberly | |
| 7,843,511 B2 | 11/2010 | Kang et al. | |
| 8,537,201 B2 | 9/2013 | Choi et al. | |
| 8,542,221 B1* | 9/2013 | Wyatt | G06F 15/00 345/204 |
| 9,122,369 B2 | 9/2015 | Hwang | |
| 2002/0126584 A1 | 9/2002 | Wimberly | |
| 2005/0248587 A1 | 11/2005 | Kamiyama et al. | |
| 2006/0114363 A1 | 6/2006 | Kang et al. | |
| 2008/0007807 A1 | 1/2008 | Yamada et al. | |
| 2011/0119355 A1 | 5/2011 | Hwang | |
| 2012/0092450 A1* | 4/2012 | Choi | H04N 13/004 348/43 |
| 2013/0127905 A1 | 5/2013 | Zhang et al. | |
| 2013/0155036 A1* | 6/2013 | Kim | G09G 3/2092 345/204 |
| 2013/0169765 A1 | 7/2013 | Park et al. | |
| 2014/0062877 A1 | 3/2014 | Lee | |
| 2014/0063052 A1 | 3/2014 | Choi | |
| 2015/0105125 A1 | 4/2015 | Min et al. | |

FOREIGN PATENT DOCUMENTS

| | | |
|---|---|---|
| CN | 102184070 A | 9/2011 |
| CN | 103136157 A | 6/2013 |
| EP | 1 662 795 A2 | 5/2006 |
| EP | 2 611 152 A2 | 7/2013 |
| JP | 10-285385 A | 10/1998 |
| KR | 1991-0010287 A | 6/1991 |
| KR | 10-0603127 B1 | 7/2006 |
| KR | 10-2007-0020986 A | 2/2007 |
| KR | 10-2011-0054791 A | 5/2011 |
| KR | 10-2014-0029051 A | 3/2014 |

* cited by examiner

METHOD AND APPARATUS FOR MERGING IMAGES BY ELECTRONIC DEVICE

CROSS-REFERENCE TO RELATED APPLICATION(S)

This application claims the benefit under 35 U.S.C. § 119(a) of a Korean patent application filed on Oct. 27, 2015 in the Korean Intellectual Property Office and assigned Serial number 10-2015-0149697, the entire disclosure of which is hereby incorporated by reference.

TECHNICAL FIELD

The present disclosure relates to a method for operating an electronic device which outputs a screen via a display driving circuit and the electronic device for supporting the same.

BACKGROUND

An electronic device such as a smartphone, a tablet personal computer (PC), or a smart watch may output a variety of content such as videos, images, and text on its display panel. The display panel may be driven via a display driving circuit of the electronic device. The display driving circuit may receive image data from a processor in the electronic device and may output the received image data on the display panel.

The display driving circuit according to the related art only performs a function of receiving image data from the processor and outputting the received image data on the display panel. The display driving circuit according to the related art does not generate a separate image or use signals received from peripheral circuits.

Also, an application processor (AP) has to be repeatedly driven in order for the display driving circuit according the related art to output a touch-related image or output a second hand of a digital watch or an analog watch, resulting in increased power consumption.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for operating an electronic device to reduce the number of times of driving an application processor (AP) by generating and outputting an image added to a main image at its display driving circuit and the electronic device for supporting the same.

Another aspect of the present disclosure is to provide a method for operating an electronic device to perform calculation of a second hand using its display driving circuit and to output an analog watch or a digital watch and the electronic device for supporting the same.

Another aspect of the present disclosure is to provide a method for operating an electronic device to quickly output a zoomed-in image for a portion a user wants using its display driving circuit and the electronic device for supporting the same.

In accordance with an aspect of the present disclosure, a method of operating an electronic device is provided. The method includes receiving, by a display driving circuit of the electronic device, main image data over a first channel from a first processor or a second processor of the electronic device, outputting, by the display driving circuit, a main image on a display panel of the electronic device based on the main image data, generating, by the display driving circuit, an additional image different from the main image, merging, by the display driving circuit, the main image with the additional image, and outputting, by the display driving circuit, the merged image on the display panel.

In accordance with an aspect of the present disclosure, an electronic device is provided. The electronic device includes a first processor; a second processor, which is independent of the first processor, configured to perform calculation for a function, a display panel, and a display driving circuit configured to receive main image data over a first channel from the first processor or the second processor, output a main image based on the main image data, generate an additional image different from the main image, merge the main image with the additional image, and output the merged image on the display panel.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
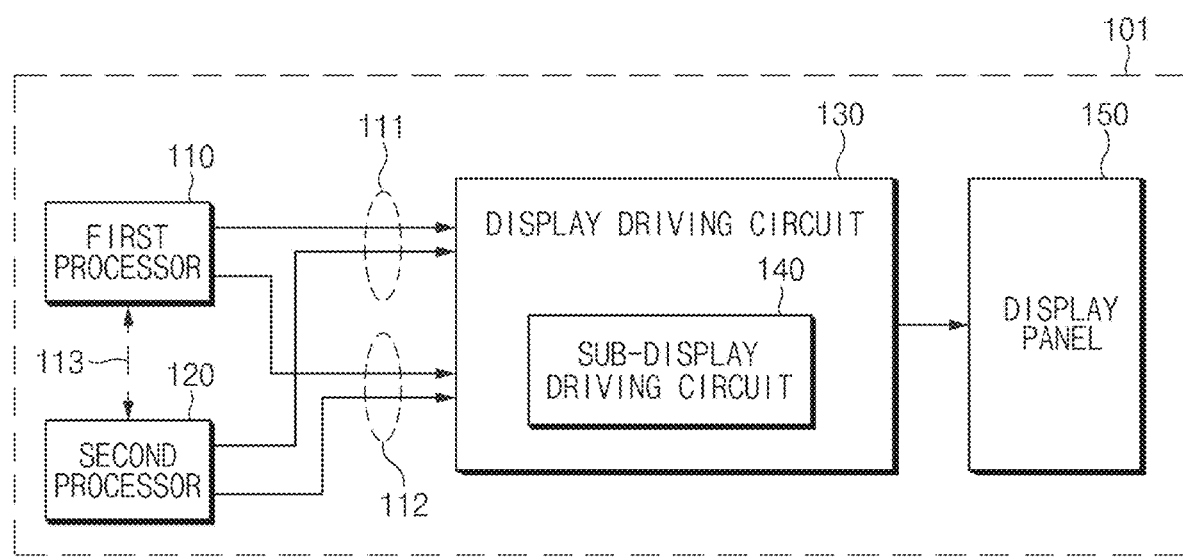
FIG. 1 is a block diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly; it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. Central processing unit (CPU), for example, a "processor configured to (or set to) perform A, B, and C" may mean a dedicated processor (for example, an embedded processor) for performing a corresponding operation or a generic-purpose processor (for example, a CPU or an application processor (AP)) which may perform corresponding operations by executing one or more software programs which are stored in a memory device.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital versatile disc (DVD) player, an audio, a refrigerator, an air conditioner, a cleaner, an oven, a microwave oven, a washing machine, an air cleaner, a set-top box, a home automation control panel, a security control panel, a television (TV) box (for example, Samsung HomeSync™, Apple TV™, or Google TV™), a game console (for example, Xbox™ or PlayStation™), an electronic dictionary, an electronic key, a camcorder, or an electronic panel.

In an embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 is a block diagram illustrating a configuration of an electronic device according to an embodiment of the present disclosure.

Referring to FIG. 1, an electronic device 101 may be a device such as a smartphone and a tablet PC or a wearable device such as a smart watch and a smart band, each of which has a screen output function. The electronic device 101 may include a first processor 110, a second processor 120, a display driving circuit 130, and a display panel 150.

The first processor 110 may execute, for example, calculation or data processing about control and/or communication of at least another component of the electronic device 101. In various embodiments, the first processor 110 may be a CPU or an AP.

The processor 110 may send image data to be output on the display panel 150 to the display driving circuit 130 over a first channel 111. An image (hereinafter referred to as "main image") output through the image data may be output on a frame-by-frame basis on the display panel 150. For example, if the display panel 150 outputs a screen at a rate of 60 frames per second, the first processor 110 may send image data corresponding to one frame to the display driving circuit 130 60 times per second. The display driving unit 130 may generate a main image based on each image data and may output the generated main image on the display panel 150.

According to various embodiments, if a currently output first frame is the same as a second frame to be output subsequent to the first frame, the first processor 110 may not send separate image data to the display driving circuit 130. In this case, the display driving circuit 130 may continue outputting a still image stored in its graphic random access memory (RAM).

According to various embodiments, the first processor 110 may provide data, image processing of which is performed using a specified algorithm, to the display driving circuit 130. For example, the first processor 110 may compress a screen frame data using the specified algorithm and may provide the compressed data to the display driving circuit 130 at a fast speed. The display driving circuit 130 may decompress a compressed image and may output the decompressed image on the display panel 150.

In various embodiments, the first processor 110 may send a control signal to the display driving circuit 130 over a second channel 112. The control signal may be a signal of a text format, distinguished from the image data. The display driving circuit 130 may generate an image (hereinafter referred to as "additional image") to be output together with the main image received over the first channel 111 based on the control signal.

The second processor 120 may be a separate processor independent of the first processor 110. The second processor 120 may be a processor which performs calculation necessary for executing a specified function to be different from the first processor 110. The second processor 120 may send image data or a control signal to the display driving circuit 130 to be similar to the first processor 110. The second processor 120 may send image data to the display driving circuit 130 over the first channel 111 and may send a control signal to the display driving circuit 130 over the second channel 112. The image data may be data for forming a main image output on the display panel 150. The control signal may be a signal for generating an additional image output by being added to the main image.

In various embodiments, the second processor 120 may be a module or chip such as a communication processor (CP), a touch control circuit, a touch pen control circuit, or a sensor hub.

The CP may perform a function of managing a data link in communication between the electronic device 101 and other electronic devices connected with the electronic device 101 by a network and converting a communication protocol. The CP may perform calculation for a communication service such as a voice call service, a video call service, a text message service (e.g., a short message service (SMS), a multimedia message service (MMS), and the like), or a packet data service.

The touch control circuit may control a touch panel correspondingly combined with the display panel 150. The touch control circuit may process touch gesture information input from the touch panel or may control an operation of the touch panel. The touch controller circuit may include a driver circuit, a sensor circuit, a control logic, an oscillator, a delay table, an analog-digital converter, a micro controller unit (MCU), and the like.

The sensor hub may include an MCU and may control at least one sensor. The sensor hub may collect sensing information detected by various sensors and may control an operation of each of the sensors. The sensors may include a temperature/humidity sensor, a biometric sensor, an atmospheric pressure sensor, a gyro sensor, and the like.

According to various embodiments, the second processor 120 may connect with the first processor 110 over a separate channel 113 (e.g., an inter integrated circuit (I2C)). In various embodiments, the second processor 120 may provide a control signal provided to the display driving circuit 130 to the first processor 110. For example, if the second processor 120 is a touch control circuit and if the first processor 110 is an AP, the touch control circuit may provide a coordinate of a point where a touch input of a user of the electronic device 101 occurs to both of the display driving circuit 130 and the AP. The first processor 110 may perform an operation associated with the touch input to change a main image. The display driving circuit 130 may generate an additional image on the point where the touch input occurs and may output the generated additional image together with the main image. The display driving circuit 130 may be a driving circuit for outputting an image on the display panel 150. The display driving circuit 130 may receive image data from the first processor 110 or the second processor 120 and may output an image through image conversion.

According to various embodiments, the display driving circuit 130 may include a sub-display driving circuit 140. The sub-display driving circuit 140 may generate an additional image to be output together with the main image, based on the control signal provided from the first processor 110 or the second processor 120. The additional image may be output on a partial region or a specified region of the display panel 150. Information about generating and outputting the additional image via the sub-display driving circuit 140 may be provided with reference to FIGS. 2, 3, 4, 5A to 5C, 6A to 6C, 7, 8, 9A, 9B, 10, 11, 12, 13, 14, 15, 16, and 17.

The display panel 150 may output a screen such as an image and text. The display panel 150 may be, for example, a liquid-crystal display (LCD) or an active-matrix organic light-emitting diode (AM-OLED). The display panel 150 may be implemented to be flexible, transparent, or wearable. The display panel 150 may be included in, for example, a cover of a case electrically combined with the electronic device 101.

The display panel 150 may receive and output a signal about the main image or the additional image. The display panel 150 may be implemented in the form of intersecting a plurality of data lines and a plurality of gate lines. At least one pixel is arranged in points where the data lines and the gate lines are intersected. If the display panel 150 corresponds to an OLED panel, it may include one or more switching elements (e.g., field effect transistors (FETs)) and one OLED. Each pixel may receive an image signal and the like at timing from the display driving circuit 130 and may generate light.

According to various embodiments, the first channel 111 may send image data for outputting a main image to the display driving circuit 130, and the second channel may send a control signal for generating an additional image to the display driving circuit 130. The image data may have a relatively larger data capacity than that of the control signal. The first channel 111 which transmits the image data may be a channel which secures a data transmission rate which is faster than the second channel 112 which transmits the control signal. For example, the first channel ill may be a high speed serial interface (HiSSI), and the second channel 112 may be a low speed serial interface (LoSSI).

Figure 2:
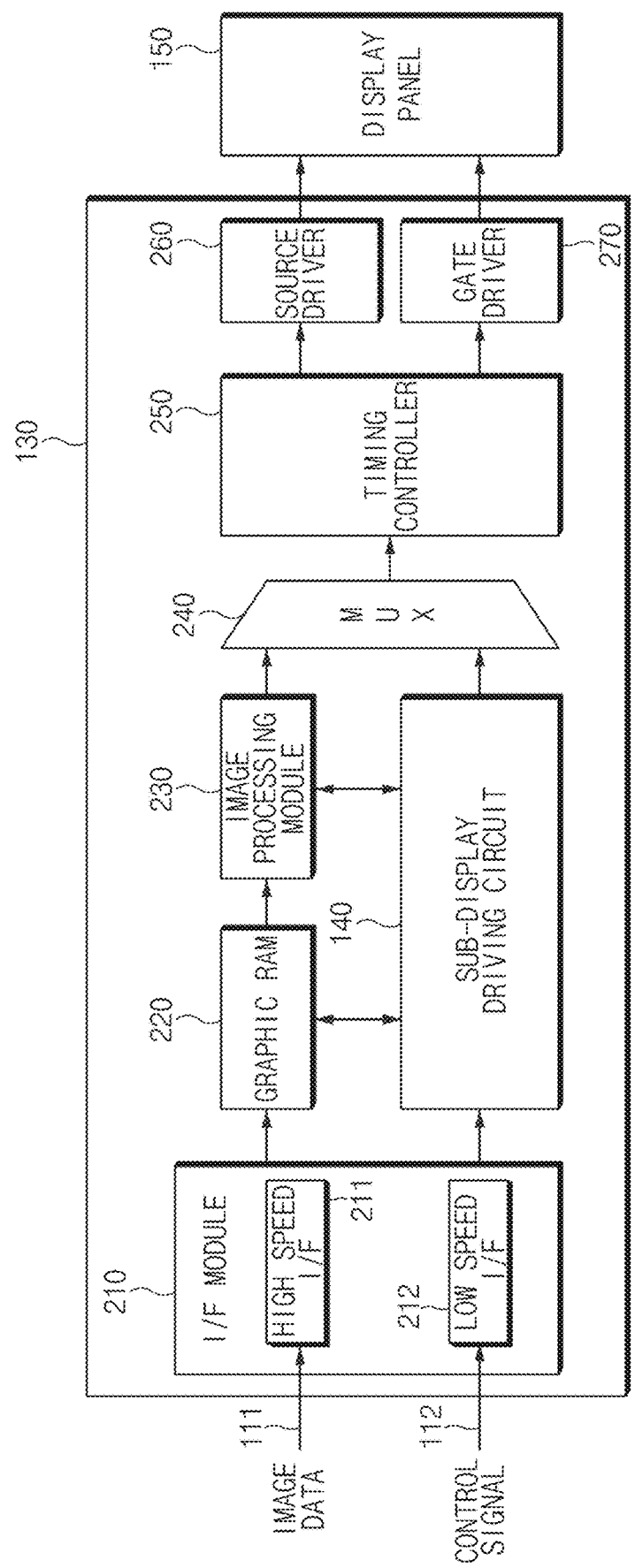
FIG. 2 is a block diagram illustrating a detailed configuration of a display driving circuit according to an embodiment of the present disclosure.

FIG. 2 is a block diagram illustrating a detailed configuration of a display driving circuit according to an embodiment of the present disclosure.

Referring to FIG. 2, a display driving circuit 130 may include an interface (I/F) module 210, a graphic RAM 220, an image processing module 230, a sub-display driving circuit 140, a multiplexer 240, a timing controller 250, a source driver 260, and a gate driver 270.

The I/F module 210 may receive image data or a control signal from a processor 110 or a second processor 120 of FIG. 1. The I/F module 210 may include an HiSSI 211 and an LoSSI 212. The HiSSI 211 may establish a first channel 111 which may receive image data for a main image, and the LoSSI 212 may establish a second channel 112 which may receive control information for generating an additional image. In various embodiments, the I/F module 210 may further include an I/F controller (not shown) for controlling the HiSSI 211 and the LoSSI 212.

The HiSSI 211 (e.g., a mobile industry processor interface (MIPI)) may receive image data from the processor 110 or the second processor 120 and may provide the image data to the graphic RAM 220. The HiSSI 211 may quickly transmit image data having relatively more amounts of data than that of a control signal.

The LoSSL 212 (e.g., a serial peripheral interface (SPI) or an I2C) may receive a control signal from the first processor 110 or the second processor 120 and may provide the control signal to the sub-display driving circuit 140.

The graphic RAM 220 may store the image data provided from the first processor 110 or the second processor 120. The graphic RAM 220 may include a memory space corresponding to resolution and/or the number of color gradations of a display panel 150. The graphic RAM 220 may be referred to as a frame buffer or a line buffer.

The image processing module 230 may convert the image data stored in the graphic RAM 220 into an image. The image data stored in the graphic RAM 220 may be in the form of data in which image processing is performed using a specified algorithm. The image data may be compressed using the specified algorithm for fast transmission, and the compressed image data may be sent to the first channel 111. The image processing module 230 may decompress a compressed image and may output the decompressed image on the display panel 150. In various embodiments, the image processing module 230 may improve image quality of image data. Although not illustrated, the image processing module 230 may include a pixel data processing circuit, a pre-processing circuit, a gating circuit, and the like.

The sub-display driving circuit 140 may receive the control signal from the LoSSI 212. The sub-display driving circuit 140 may generate an additional image to be output together with a main image based on the control signal. For one example, the additional image may be a simple graphic symbol, such as a circle or an icon, output on a partial region or a specified region of the display panel 150. For another example, the additional image may be numbers (e.g., 00 second to 59 seconds) of a second hand of a digital watch or a second hand of an analog watch. Information about generating the additional image via the sub-display driving circuit 140 will be provided with reference to FIGS. 3, 4, 5A to 5C, 6A to 6C, 7, 8, 9A, 9B, 10, 11, 12, 13, 14, 15, 16, and 17.

The multiplexer 240 may merge a signal for the main image output from the image processing module 230 with a signal for the additional image output from the sub-display driving circuit 140 and may provide the merged signal to the timing controller 250.

The timing controller 250 may generate a data control signal for controlling operation timing of the source driver 260 and a gate control signal for controlling operation timing of the gate driver 270 based on the signal merged by the multiplexer 240.

The source driver 260 and the gate driver 270 may generate signals respectively provided to a scan line and a data line of the display panel 150, based on the source control signal and the gate control signal received from the timing controller 250.

Figure 3:
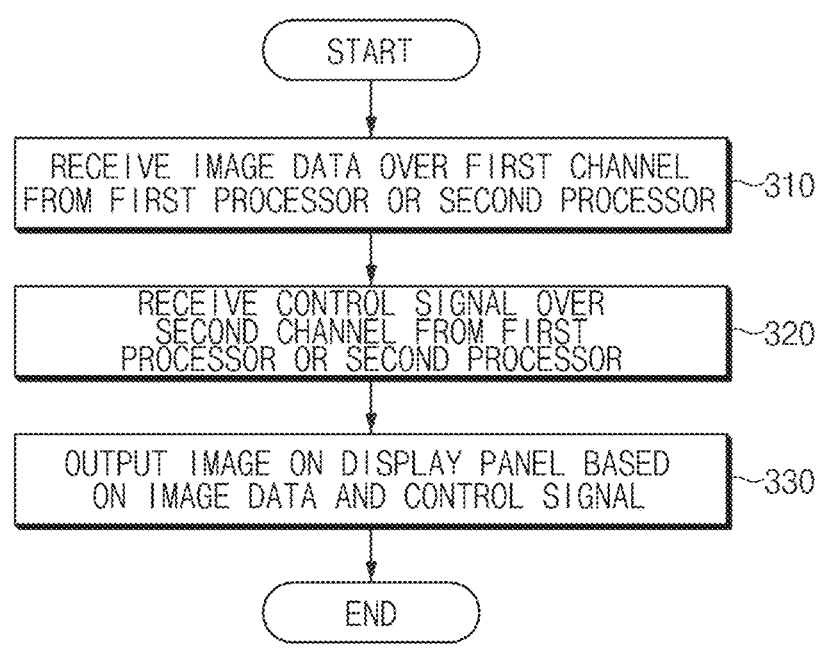
FIG. 3 is a flowchart illustrating a method for operating an electronic device according to an embodiment of the present disclosure.

FIG. 3 is a flowchart illustrating a method for operating an electronic device according to an embodiment of the present disclosure.

Referring to FIG. 3, in operation 310, a display driving circuit 130 of FIG. 1 may receive image data (hereinafter referred to as "main image data") over a first channel 111 of FIG. 1 from a first processor 110 or a second processor 120 of FIG. 1.

For example, the first processor 110 or the second processor 120 may provide various images (e.g., an album view screen, a video output screen, a memo note, a schedule screen, a keyboard input screen, and the like) according to execution of an application to the display driving circuit 130. In various embodiments, the main image data may be a sleep screen, an idle screen, a home screen, a lock screen, or the like.

In operation 320, the display driving circuit 130 may receive a control signal over a second channel 112 of FIG. 2 from the first processor 110 or the second processor 120. The control signal may be a signal of a text format, distinguished from the main image data received over the first channel 111.

According to various embodiments, the control signal may be coordinate information on a screen by a body (e.g., a finger) or a touch pen of a user of the electronic device 101, arranged to be adjacent to the screen. For example, if the second processor 120 is a touch control circuit and if the body (e.g., the finger) of the user is arranged to be adjacent to the screen, the touch control circuit may send a coordinate value of the closest location to the body of the user or a capacitance change value on the coordinate to the display driving circuit 130 over the second channel 112.

In operation 330, the display driving circuit 130 may output an image on a display panel 150 of FIG. 1 based on the main image data and the control signal. The display driving circuit 130 may generate an additional image based on the control signal. The display driving circuit 130 may merge the generated additional image with a main image based on the main image data and may output the merged image.

For one example, if receiving the coordinate value of the closest location to the body of the user or the capacitance change value on the coordinate from the touch control circuit, the display driving circuit 130 may generate a shadow image (e.g., a circle or oval) of lowering luminance of pixels which belongs to a specified range on the coordinate value as an additional image. The shadow image may be directly displayed via the display driving circuit 130. Information about a process of receiving the control signal from the touch control circuit or the touch pen control circuit and generating the additional image will be provided with reference to FIGS. 5A to 5C and 6A to 6C.

For another example, the display driving circuit 130 may receive a control signal associated with driving a digital watch or an analog watch from the first processor 110 or the second processor 120. The display driving circuit 130 may display hour and minute information of the digital watch or the analog watch through a main image, may generate an additional image of displaying second information generated in the display driving circuit 130, may merge the generated additional image with the main image, and may output the merged image. Information about a method of showing the digital watch or the analog watch in the display driving circuit 130 will be provided with reference to FIGS. 10 to 15.

Figure 4:
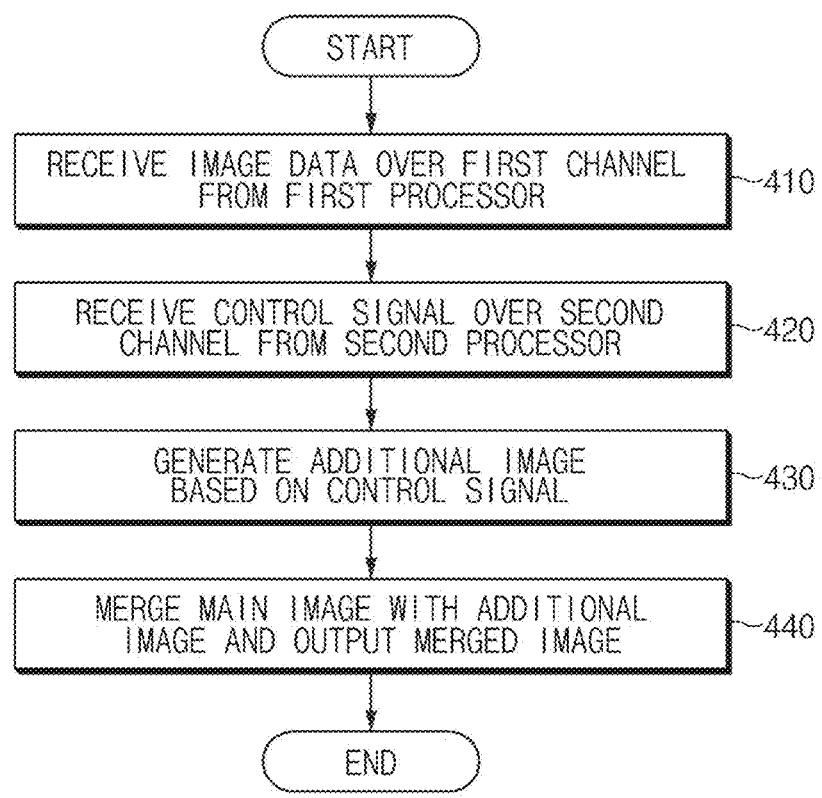
FIG. 4 is a flowchart illustrating a method for operating an electronic device using a plurality of processors according to an embodiment of the present disclosure.

FIG. 4 is a flowchart illustrating a method for operating an electronic device using a plurality of processors according to an embodiment of the present disclosure.

Referring to FIG. 4, in operation 410, a display driving circuit 130 of FIG. 1 may receive main image data over a first channel 111 of FIG. 1 from a first processor 110 of FIG. 1. The display driving circuit 130 may output a main image through the main image data. For example, the main image data may be data about an execution screen of various applications, a home screen, an idle screen, a sleep screen, and the like. In various embodiments, the first processor 110 may be an AP.

In operation 420, the display driving circuit 130 may receive a control signal over a second channel 112 of FIG. 1 from a second processor 120 of FIG. 1. The control signal may be a signal of a text format, distinguished from the main image data received over the first channel 111. In various embodiments, the second processor 120 may be a touch control circuit, a touch pen controller, or the like.

For example, the display driving circuit 130 may receive coordinate information of a point, where a body (e.g., a finger) of a user of an electronic device 101 of FIG. 1 is adjacent to a screen, from the touch control circuit. The coordinate information may be transmitted over the second channel 112.

In operation 430, the display driving circuit 130 may generate an additional image according to the control signal. The control signal may be a message signal of a text format. The display driving circuit 130 may generate an additional image based on information (e.g., coordinate information) included in the control signal.

For one example, if receiving coordinate information from the touch control circuit, the sub-display driving circuit 140 may generate a shadow image on the coordinate. The shadow image may be generated by lowering a luminance value of pixels included within a specified range.

For another example, if receiving coordinate information of a location to which a touch pen is currently arranged to be adjacent from the touch pen control circuit, the display driving circuit 130 may generate a circular image on the coordinate. The sub-display driving circuit 140 may be configured to output an output color of pixels, which are within a specified distance from the coordinate, as a first color (e.g., black) and may be configured to output pixels adjacent to the pixels of the first color with a second color (e.g., gray).

In operation 440, the display driving circuit 130 may merge the main image with the additional image and may output the merged image on a display panel 150 of FIG. 1. The display driving circuit 130 may merge the additional image based on the control signal provided from the second processor 120 with a main image through the main image data provided from the first processor 110 and may output the merged image. In various embodiments, the display driving circuit 130 may change settings of some pixels in settings of pixels which constructs the main image and may reflect the additional image in the main image.

According to various embodiments, the display driving circuit 130 may be configured to merge the additional image with the main image during a specified time or a specified frame. For example, if receiving a new main image to which an image corresponding to the additional image is added from the first processor 110, the display driving circuit 130 may stop the operation of merging the additional image generated based on the control signal with the main image.

Figure 5A:
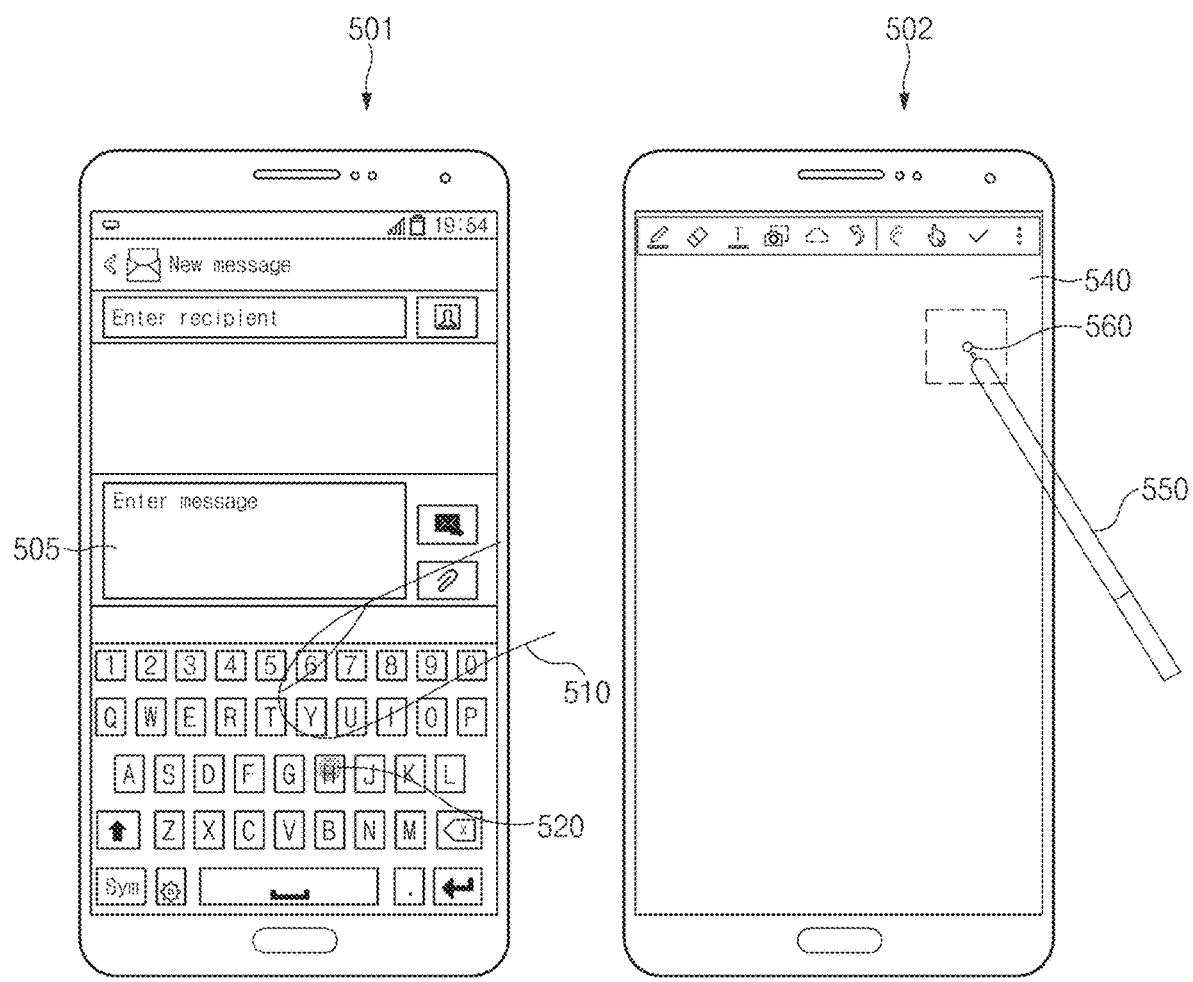
FIG. 5A is a screen illustrating a method for operating an electronic device according to an embodiment of the present disclosure.

FIG. 5A is a screen illustrating a method for operating an electronic device according to an embodiment of the present disclosure.

Referring to FIG. 5A, a display driving circuit 130 of FIG. 1 may add an additional image to a main image based on main image data provided via a first processor 110 (e.g., an AP) and may output the added image. The additional image (e.g., a shadow image and a circular or oval image) may be generated based on a control signal provided from a second processor 120 of FIG. 1 (e.g., a touch control circuit and a touch pen control circuit).

In a screen 501, an embodiment is exemplified as a shadow image 520 is output as an additional image if a body (e.g., a finger 510) of a user is arranged to be adjacent to a screen.

The display driving circuit 130 may output a main image 505 (e.g., a message input screen) on the screen 501 based on the main image data provided from the first processor 110. The main image 505 may be output on a frame-by-frame basis. In various embodiments, if a currently output first frame is the same as a second frame to be output subsequent to the first frame, the first processor 110 may not send separate main image data to the display driving circuit 130. In this case, the display driving circuit 130 may continue outputting a still image stored in its graphic RAM. The first processor 110 may provide new main image data to the display driving circuit 130 per specified time period or if there is a change to a currently outputted main image.

If the finger 510 of the user approaches the screen 501 while the main image is output, a change in capacitance may occur at a specific point of a touch panel adjacent to the finger 510. The second processor 120 (e.g., a touch control circuit) may extract a coordinate value of the point. The second processor 120 may provide the extracted coordinate value to the display driving circuit 130 over a second channel 112 of FIG. 1.

The display driving circuit 130 may generate a shadow image 520 on the coordinate. The shadow image 520 may be generated by lowering a luminance value of pixels included in a specified range (e.g., a circle) or changing a hue value. For example, pixels included in the shadow image 520 may be set with a color (e.g., gray) which is darker than a peripheral region.

The display driving circuit 130 may merge the shadow image 520 with a currently outputted screen (e.g., a memo note, a text input window, a keyboard, and the like) of an application and may output the merged image. The user may verify where a point he or she will touch is, through an additional image. Since the first processor (e.g., the AP) is in a state where separate main image data is not transmitted to the display driving circuit 130 or in a sleep state while the additional image is output, power dissipation may be reduced.

According to various embodiments, the first processor 110 may receive a coordinate value of a point where a touch occurs from the touch control circuit which is the second processor 120. The first processor 110 may generate a main image in which a shadow image is reflected on a coordinate and may provide the generated main image to the display driving circuit 130. In this case, the display driving circuit 130 may stop outputting an additional image. The display driving circuit 130 may receive a signal for stopping outputting of the additional image over a second channel 112 from the first processor 110 (e.g., the AP) or the second processor 120 (e.g., the touch control circuit).

In a screen 502, an embodiment is exemplified as a circular image 560 by approach of a touch pen 550 is output as an additional image.

The display driving circuit 130 may output a main image 540 (e.g., a memo note input screen) on the screen 502 based on main image data provided from the first processor 120. The main image 540 may be output on a frame-by-frame basis. In various embodiments, the display driving circuit 130 may continue outputting a still image stored in the graphic RAM.

If the touch pen 560 approaches the screen 502 while the main image is output, a change in capacitance may occur at a specific point of a touch panel adjacent to the touch pen 560. The second processor 120 (e.g., a touch pen control circuit (e.g., a Wacom integrated circuit (IC))) may extract a coordinate value of the point. The second processor 120 may provide the extracted coordinate value to the display driving circuit 130 over the second channel 112.

The display driving circuit 130 may be configured to output pixels, which are within a specified distance from a coordinate, using a first color (e.g., a black color). In various embodiments, the display driving circuit 130 may be configured to naturally form the circular image 560 through anti-aliasing processing of outputting pixels adjacent to the pixels of the first color using a second color (e.g., a gray color).

In the screen 502, an embodiment is exemplified as the circular image 560 is reflected in the main image 540 based on a location of the touch pen 550. However, embodiments are not limited thereto. For example, the display driving circuit 130 may be configured to output a hovering menu of the touch pen 550 as an additional image. The display driving circuit 130 may draw a circular or hovering menu through calculation (e.g., integer calculation) of a simple form.

Figure 5B:
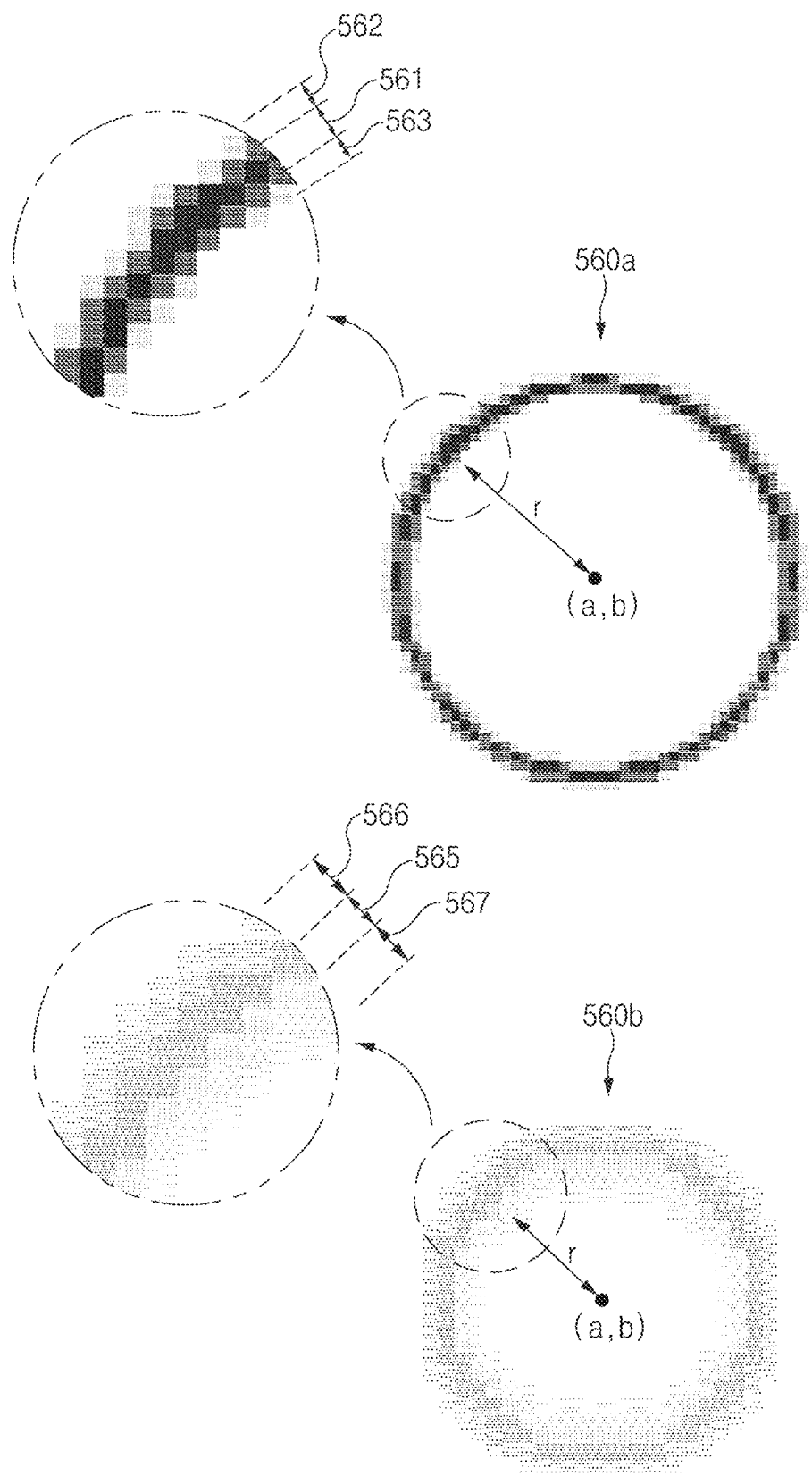
FIG. 5B is a drawing illustrating a method for showing an additional image according to an embodiment of the present disclosure.

FIG. 5B is a drawing illustrating a method for showing an additional image according to an embodiment of the present disclosure. In FIG. 5B, an embodiment is exemplified as an additional image is a circular image. However, embodiments are not limited thereto.

Referring to FIG. 5B, circular images 560a and 560b may be output via a display driving circuit 130 of FIG. 1. The display driving circuit 130 may merge the circular images 560a and 560b based on a control signal provided from a second processor 120 of FIG. 1 with a main image generated based on main image data provided from a first processor 110 of FIG. 1 and may output the merged image.

In the circular image 560a, the display driving circuit 130 may receive a coordinate value about a specific point (e.g., a point where a touch input of a user occurs or a point adjacent to a touch pen) on a screen from the second processor 120.

For example, if the coordinate value is (a, b), the display driving circuit 130 may draw the circular image 560a which has the coordinate value (a, b) as an origin point. The display driving circuit 130 may draw the circular image 560a according to Equation 1 below.

$$(x-a)^2+(y-b)^2-r^2=D \qquad \text{Equation 1}$$

(x, y): a location of a pixel included in the circular image 560a
(a, b): a coordinate of an origin point
r: a radius of a circle
D: an anti-aliasing application distance For example, the display driving circuit 130 may output pixels of a point where D is "0" (e.g., pixels which belong to a first range 561) using a first color (e.g., a black color). The first range 561 may include pixels of a point distant from the origin point (a, b) by the radius r. The display driving circuit 130 may output pixels of a point where D is greater than "0" (e.g., pixels which belong to a second range 562) using a second color (e.g., a gray color) which is brighter than the first color. Also, the display driving circuit 130 may output pixels of a point where D is less than "0" (e.g., pixels which belong to a third range 563) using the second color (e.g., the gray color).

The display driving circuit 130 may allow the circular image 560a to externally form a natural circle through anti-aliasing processing based on a D value.

According to various embodiments, the display driving circuit 130 may blend at least some of the pixels which belong to the first range 561 to the third range 563 with a main image (or a background image) and may output the blended image. For example, the display driving circuit 130 may blend the pixels which belong to the first range 561 with a background image at a specified ratio (e.g., the ratio of 50:50, the ratio of 25:75, and the like) and may output the blended image. In this case, the circular image 560a may have the similar color to that of the background image, and the sense of difference between the circular image 560a and the background image may be reduced.

According to various embodiments, the display driving circuit 130 may output the inside of the circular image 560a using the main image (or the background image). For example, the display driving circuit 130 may fill the inside of the circular image 560a with an image in which the background image is inverted.

According to various embodiments, although a control signal is not received from the second processor 120, the display driving circuit 130 may output an additional image (e.g., the circular image 560a). For example, although a separate coordinate value is not received from the touch control circuit which is the second processor 120, the display driving circuit 130 may output the circular image 560a on a coordinate (e.g., the center of a screen) set to a default. If a separate coordinate value is received through a control signal, the display driving circuit 130 may move the circular image 560a using the coordinate value.

In a circular image 560b, the display driving circuit 130 may set different colors to ranges. For example, the display driving circuit 130 may output pixels which belong to a first range 565 of a point where D is "0", using a first color (e.g., a black color). The display driving circuit 130 may output pixels of a point where D is greater than "0" (e.g., pixels which belong to a second range 566) using a second color (e.g., a gray color) which is brighter than the first color. The display driving circuit 130 may output pixels of a point where D is less than "0" (e.g., pixels which belong to a third range 567) using a third color (e.g., a blue color) which is different from the first color or the second color.

In FIG. 5B, an embodiment is exemplified as it is classified into three intervals based on an anti-aliasing application distance D. However, embodiments are not limited thereto. For one example, the display driving circuit 130 may sequentially output the inside of a circle using a different color to provide various visual effects to the user. For another example, the display driving circuit 130 may display a circle based on an interval to output two or more circular images in the form of overlapping the two or more circular images.

Figure 5C:
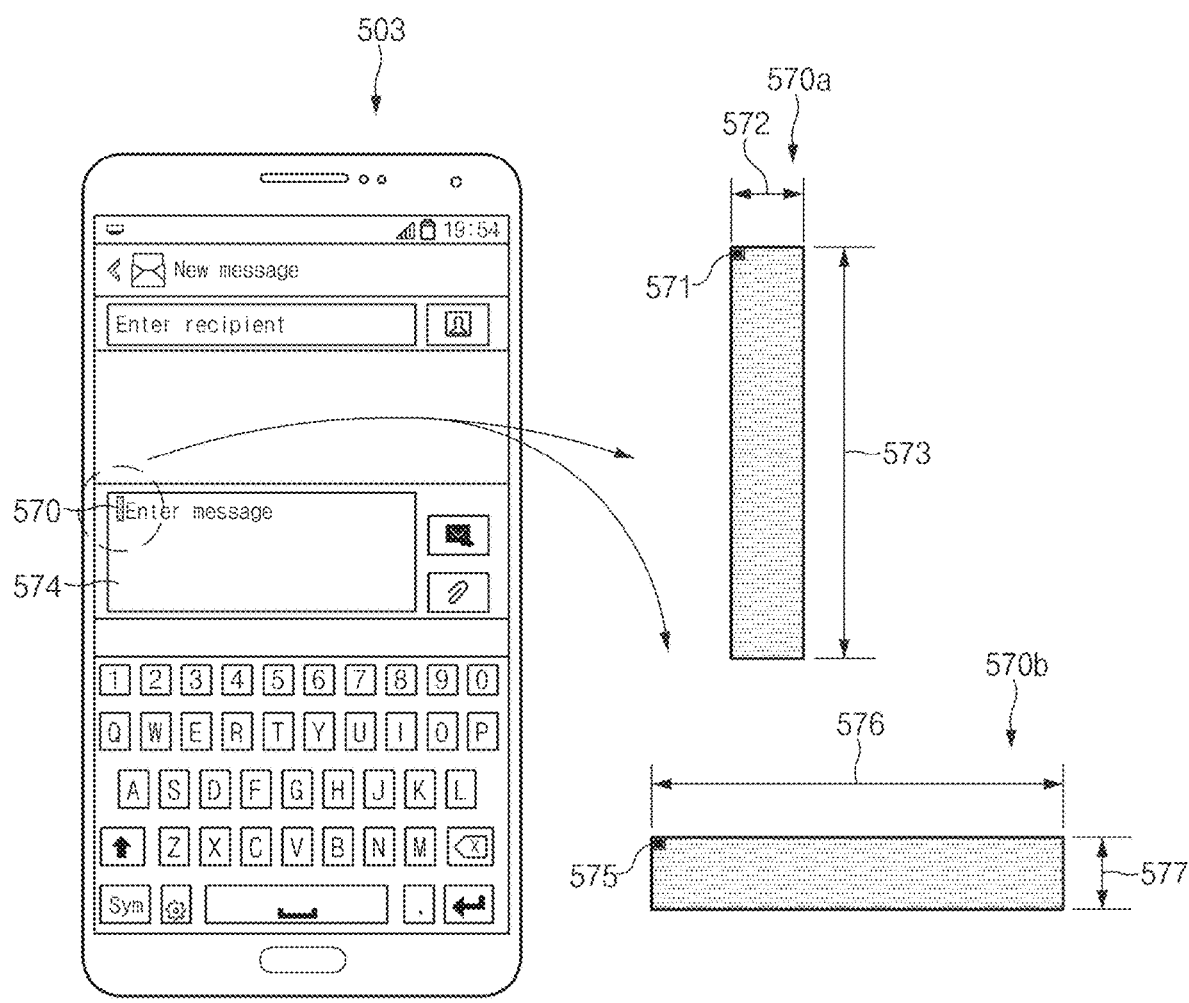
FIG. 5C is a screen illustrating a process of outputting a cursor image as an additional image according to an embodiment of the present disclosure.

FIG. 5C is a screen illustrating a process of outputting a cursor image as an additional image according to an embodiment of the present disclosure.

Referring to FIG. 5C, a display driving circuit 130 of FIG. 1 may merge an additional image (e.g., a cursor image 570) with a main image based on main image data provided via a first processor 110 of FIG. 1 (e.g., an AP) and may output the merged image on a screen 503. The additional image (e.g., the cursor image 570) may be generated based on a control signal provided from a second processor 120 of FIG. 1 (e.g., a touch control circuit and a touch pen control circuit).

In the screen 503, an embodiment is exemplified as the cursor image 570 is output as the additional image by an application, such as a message application or a social network service (SNS) application, which may enter text.

The display driving circuit 130 may output a main image (e.g., a message application screen) on the screen 503 based on main image data provided from the first processor 110. The main image may be output on a frame-by-frame basis.

If a user touches a text input window 574 while the main image (e.g., the message application screen) is output, the cursor image 570 may be generated on a first point (e.g., a left upper end of the text input window 574). The second processor 120 may provide a coordinate value of a coordinate the user touches to the display driving circuit 130 over a second channel 112 of FIG. 1.

If the coordinate value is included within a range of the text input window 574, the display driving circuit 130 may generate the cursor image 570 on the first point.

According to various embodiments, the display driving circuit 130 may output the cursor image 570 to turn on/off the cursor image 570 at specified time intervals (e.g., 0.5 seconds). While outputting the cursor image 570 to be turned on/off, the display driving circuit 130 may not change the main image (e.g., the message application screen) provided via the first processor 110.

According to various embodiments, the cursor image 570 may be output in the form of one of a form (e.g., a cursor image 570a) extended in a first direction (e.g., a longitudinal direction) or a form (e.g., a cursor image 570b) extended in a second direction (e.g., a transverse direction). The cursor image 570a may be shown relative to a start point 571 and may have a width 572 and a height 573. The width 572 is smaller than the height 573. The cursor image 570a may be turned on/off at a left or right side of entered text.

The cursor image 570b may be shown relative to a start point 575 and may have a width 576 and a height 577. The width 576 is larger than the height 577. The cursor image 570b may be turned on/off at a lower end of entered text.

According to various embodiments, if a start point (e.g., the start point 571 or 575) of the cursor image 570a or 570b is changed based on a text input of the user, the first processor 110 or the second processor 120 may provide a coordinate value changed to a control signal to the display driving circuit 130 over a second channel 112 of FIG. 2. The display driving circuit 130 may output the cursor image 570a or 570b relative to the changed start point.

Figure 6A:
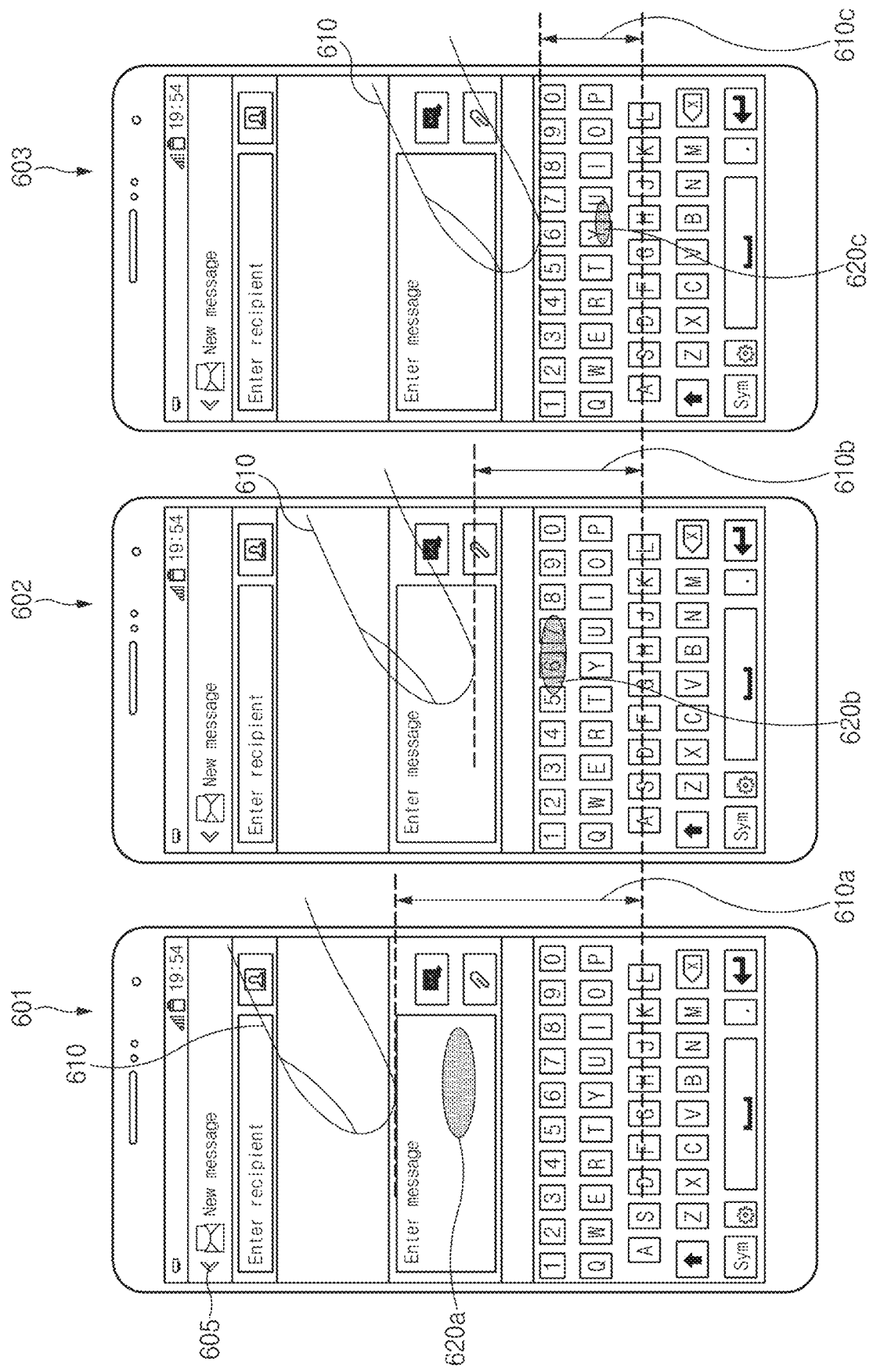
FIG. 6A is a screen illustrating a process of outputting a changed additional image according to an embodiment of the present disclosure.

FIG. 6A is a screen illustrating a process of outputting a changed additional image according to an embodiment of the present disclosure.

Referring to FIG. 6A, a display driving circuit 130 of FIG. 1 may output a main image (e.g., a message input screen) on a screen 601 based on main image data provided from a first processor 110 of FIG. 1. The main image 605 may be output on a frame-by-frame basis. In various embodiments, if a currently output first frame is the same as a second frame to be output subsequent to the first frame, the first processor 110 may not send separate main image data to the display driving circuit 130. The display driving circuit 130 may continue outputting a still image stored in its graphic RAM.

If a body (e.g., a finger 610) of a user approaches the screen 601 and is located within a first distance 610a (e.g., an initial location where capacitance of a touch panel is changed due to the approach of the finger 610), a shadow image 620a may be generated on the most adjacent point of the touch panel to the finger 610. The method of generating the shadow image 620a may be the same or similar to an output method on a screen 501 of FIG. 5A.

The shadow image 620a may be arranged on the closest point to the finger 610 (e.g., a point having the largest change in capacitance of the touch panel). For example, in case of the screen 601, the shadow image 620a may be arranged around the periphery of a message input window.

If the finger 610 is moved to be gradually close to the screens 602 and 603 such that a distance between the finger 610 and the screens 602 and 603 is close within a second distance 610b and a third distance 610c, a touch control circuit which is a second processor 120 of FIG. 1 may continue providing a changed coordinate value (e.g., a coordinate value of a point having the largest change in capacitance) as a control signal to the display driving circuit 130. A sub-display driving circuit 140 of FIG. 1 may continue adding shadow images 620b and 602c on the coordinate value and may output the added shadow images 620b and 620c.

Although the shadow images 620a to 620c are continuously changed in location due to the approach of the finger 610, the first processor 110 may not change a main image and, if some cases, may maintain a sleep state.

In various embodiments, the touch control circuit may provide a control signal including a capacitance value to the display driving circuit 130. The display driving circuit 130 may change a size of each of the shadow images 620a to 620c based on the capacitance value. For example, if the capacitance value is small, the display driving circuit 130 may generate an additional image of a relatively broad range like the shadow image 620a. If the capacitance value is large, the display driving circuit 130 may generate an additional image of a relatively narrow range like the shadow image 620c. The display driving circuit 130 may provide an effect of generating a real shadow when the finger 610 is moved to be closer to the screen 601, 602, or 603 and displaying a location the user wants to touch to him or her.

Figure 6B:
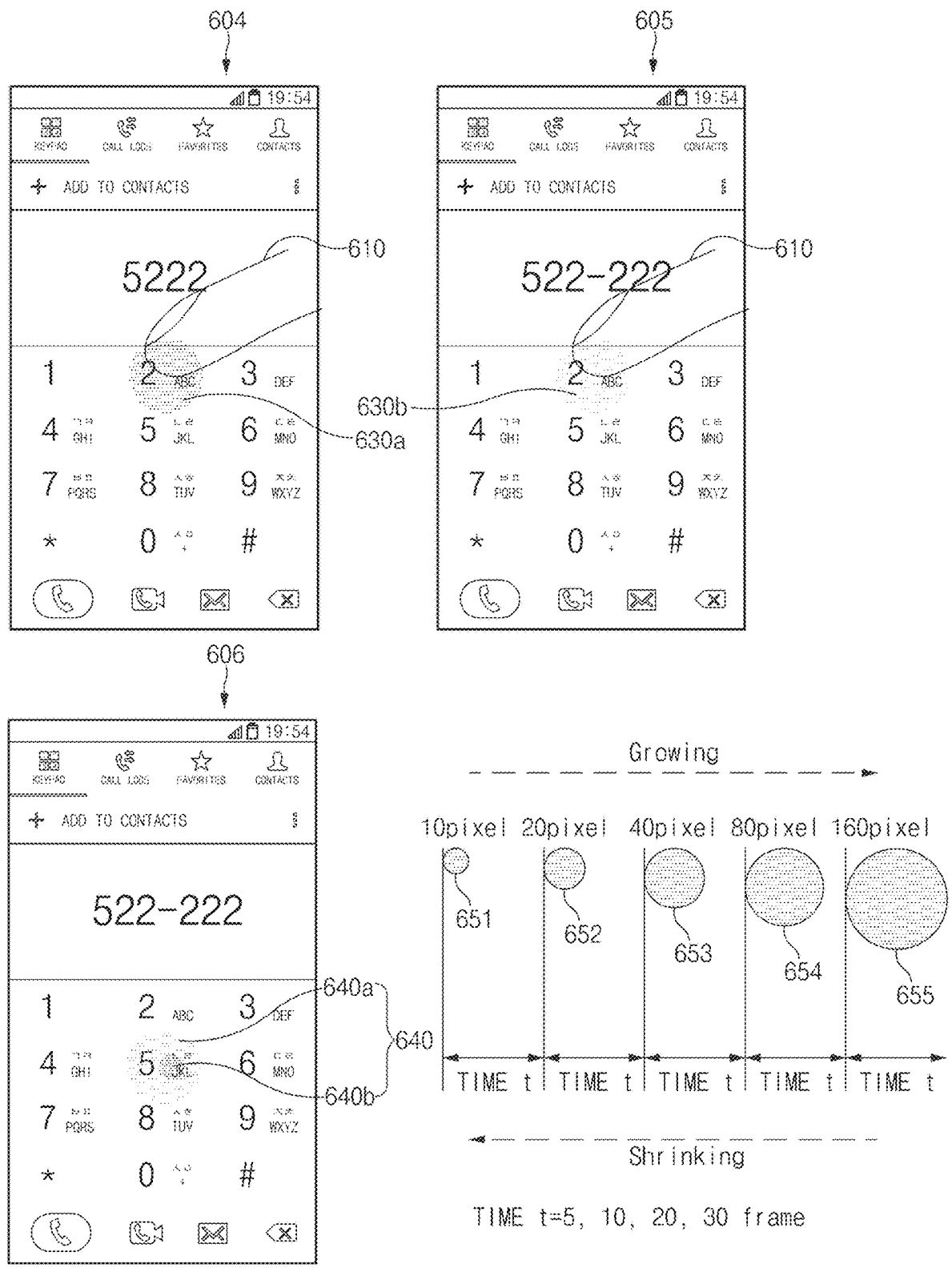
FIG. 6B is a screen illustrating a change of an additional image according to an embodiment of the present disclosure.

FIG. 6B is a screen illustrating a change of an additional image according to an embodiment of the present disclosure. In FIG. 6B, an embodiment is exemplified as a touch image is output. However, embodiments are not limited thereto.

Referring to FIG. 6B, a display driving circuit 130 of FIG. 1 may be configured to change a color of an additional image (e.g., touch images 630a and 630b) on screens 604 and 605 as a body (e.g., a finger 610) of a user is distant from the screens 604 and 605.

The display driving circuit 130 may receive and output a main image (e.g., a call keypad screen) from a first processor 110 of FIG. 1. If a touch input occurs from the user, the display driving circuit 130 may generate an additional image (e.g., the touch images 630a and 630b), may merge the generated additional image with the main image (e.g., the call keypad screen), and may output the merged image.

If a touch input of the user occurs (e.g., if the user touches the numeral 2 of a keypad), a second processor 120 of FIG. 1 (e.g., a touch control circuit) may provide the coordinate value to the first processor 110 and the display driving circuit 130. The first processor 110 may provide a main image, which displays the numeral 2 on the screens 604 and 605, to the display driving circuit 130.

The display driving circuit 130 may add the touch image 630a to the main image and may output the added image. The touch image 630a may be generated relative to a coordinate value received from the second processor 120. For example, the touch image 630a may be a semi-transparent blue circular image.

If a specified time elapses after the touch input of the user, the display driving circuit 130 may output the touch image 630b to gradually lighten the touch image 630a in color (e.g., change the touch image 630a to the touch image 630b). A user may verify a point he or she touches recently during the specified time through the change of the touch image 630a.

The display driving circuit 130 may output a touch image 640 to change the touch image 640 in size over time. In various embodiments, the display driving circuit 130 may output the touch image 640 to reduce the touch image 640 in size over time.

For example, if the user touches the numeral 5 of the keypad, the second processor 120 (e.g., the touch control circuit) may provide a coordinate value of a coordinate where a touch input occurs to the display driving circuit 130. The display driving circuit 130 may output a touch image 640a having a specified size (or area) at a time when the coordinate value is received.

In various embodiments, the display driving circuit 130 may output the touch image 640a to gradually reduce the touch image 640a in size over a time period t when a specific frame (e.g., 5 frames, 10 frames, 20 frames, and the like) is changed. An initial size of the touch image 640a may be a size of an image 655 including 160 pixels. The touch image 640a may be gradually reduced in size over the time period t and may then be changed to a touch image 640b. The touch image 640b may have a size of an image 651 including 10 pixels. For example, as shown in FIG. 6B, the image 655 may be gradually changed to a reduced size image 651 by changing the image 655 having 160 pixels to an image 654 having 80 pixels, changing the image 654 having 80 pixels to an image 653 having 40 pixels, changing the image 653 having 40 pixels to an image 652 having 20 pixels, and changing the image 652 having 20 pixels to an image 651 having 10 pixels.

In various embodiments, the display driving circuit 130 may output the touch image 640 to increase the touch image 640 in size over time. For example, if the user moves part (e.g., a finger) of his or her body to be adjacent to the screen 606 to touch the numeral 5 of the keypad, the second processor 120 (e.g., the touch control circuit) may provide a coordinate value of a point where capacitance of a touch panel is changed to the display driving circuit 130. For example, as shown in FIG. 6B, the image 651 may be gradually changed to an enlarged size image 655 by changing the image 651 having 10 pixels to an image 652 having 20 pixels, changing the image 652 having 20 pixels to an image 653 having 40 pixels, changing the image 653 having 40 pixels to an image 654 having 80 pixels, and changing the image 654 having 80 pixels to an image 655 having 160 pixels.

The display driving circuit 130 may output touch image 640b at a time when the coordinate value is received. The display driving circuit 130 may output the touch image 640b to gradually increase the touch image 640b in size over the time period t when a specified frame (e.g., 5 frames, 10 frames, 20 frames, and the like) is changed. An initial size of the touch image 640b may be a size of the image 651 including the 10 pixels. The touch image 640b may be gradually increased in size over the time period t and may be changed to the touch image 640a. The touch image 640a may have the size of the image 655 including 160 pixels.

In various embodiments, the display driving circuit 130 may output the touch image 640 to change the touch image 640 in color together with a size of the touch image 640 over time. For example, the display driving circuit 130 may set a first color for the touch image 640a and may set a second color which is darker than the first color for the touch image 640b. The display driving circuit 130 may be configured to sequentially change the touch image 640 from the first color to the second color over time.

Figure 6C:
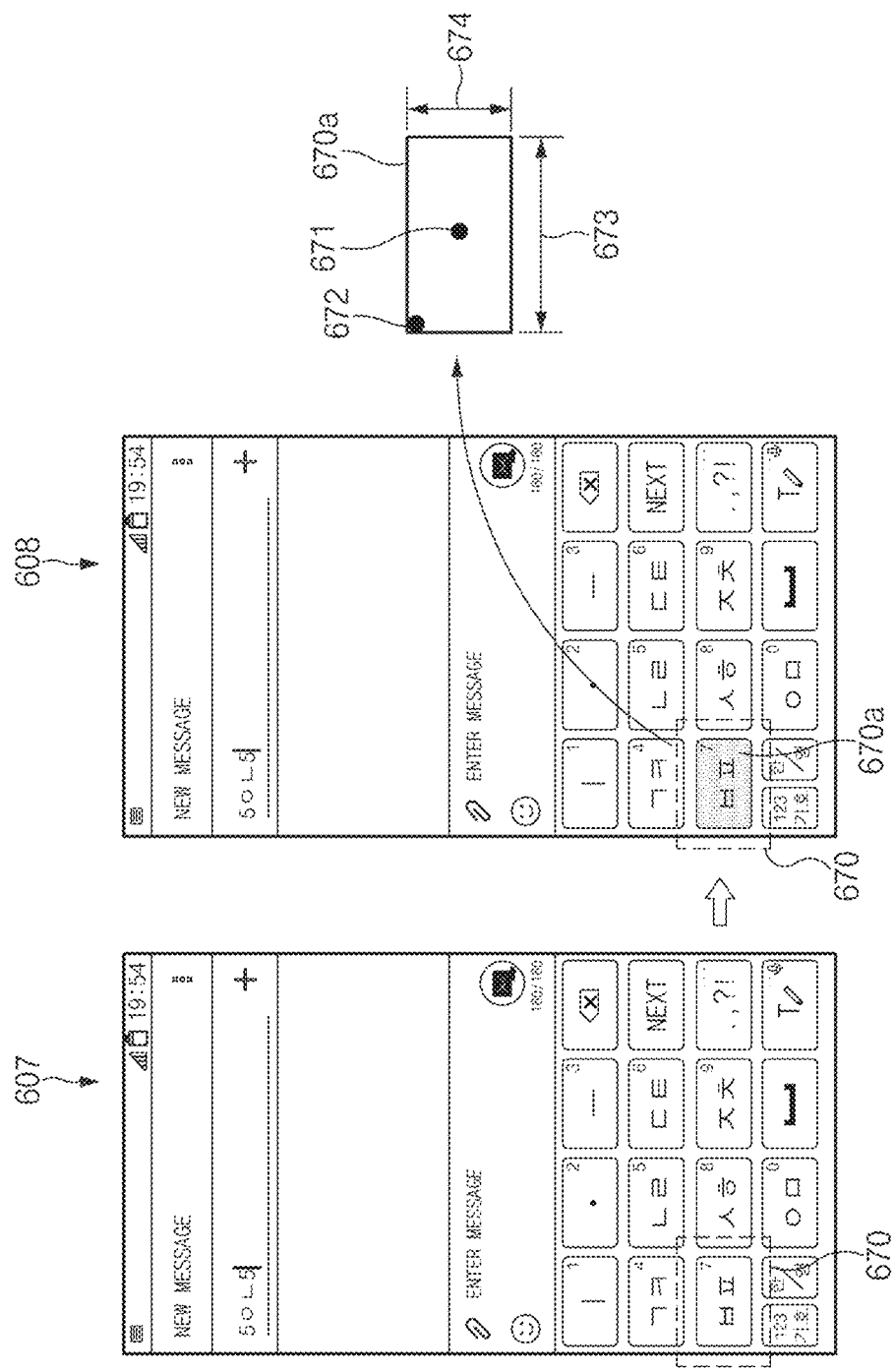
FIG. 6C is a screen illustrating a process of outputting an additional image on a specified range of a screen according to an embodiment of the present disclosure.

FIG. 6C is a screen illustrating a process of outputting an additional image on a specified range of a screen according to an embodiment of the present disclosure. In FIG. 6C, an embodiment is exemplified as a touch image is output on a keypad. However, embodiments are not limited thereto.

Referring to FIG. 6C, a display driving circuit 130 of FIG. 1 may output a touch image 670a of a specified range based on a coordinate value of a touch input.

If a main image is a text input screen, a user may push a button to be input (e.g., a button 670) and may enter text on screens 607 and 608. A second processor 120 of FIG. 1 (e.g., a touch control circuit) may provide a coordinate value of a point where a touch input of the user occurs to the display driving circuit 130.

The display driving circuit 130 may output the touch image 670a on the button 670 including the coordinate value. The touch image 670a is less than or equal to in size the button 670.

For example, if the user touches a touch point 671 which belongs to the button 670, the second processor 120 (e.g., the touch control circuit) may send a coordinate value of the touch point 671 to the display driving circuit 130 through a control signal. The display driving circuit 130 may determine a reference point 672 of the button 670 including the touch point 671. The display driving circuit 130 may output the touch image 670a having a width 673 and a height 674 on the reference point 672. In various embodiments, the width 673 and the height 674 of the touch image 670a may be less than a width and a height of the touch button 670, respectively. The user may verify a button that is currently being touched by the user or a button that the user will touch, through the touch image 670a.

Figure 7:
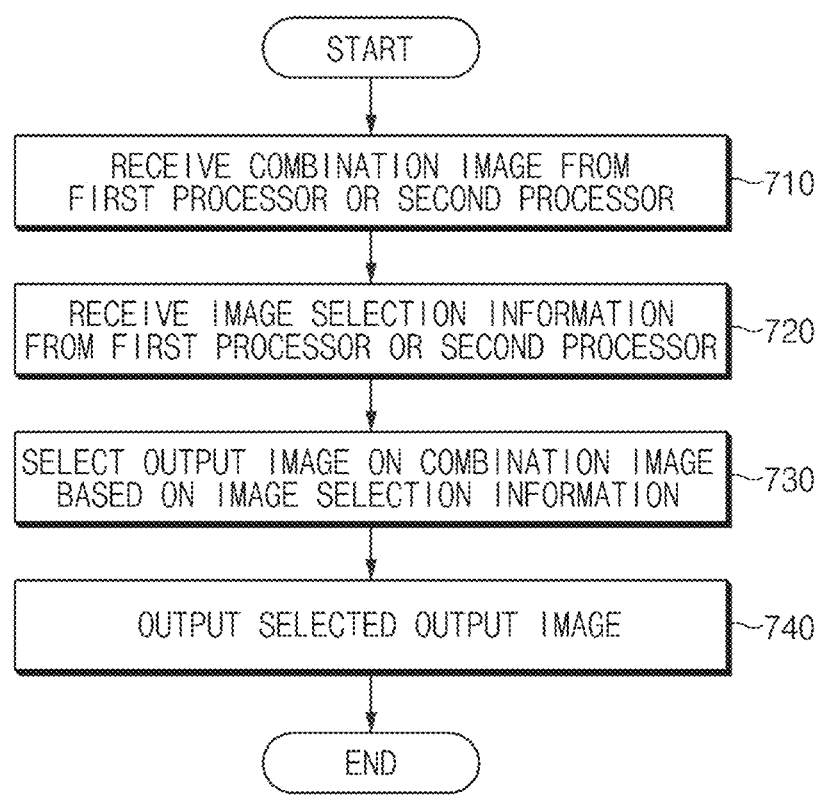
FIG. 7 is a flowchart illustrating a method for extracting a partial image from a main image configured with a plurality of images and outputting the extracted image as an additional image according to an embodiment of the present disclosure.

FIG. 7 is a flowchart illustrating a method for extracting a partial image from a main image configured with a plurality of images and outputting the extracted image as an additional image according to an embodiment of the present disclosure.

Referring to FIG. 7, in operation 710, a display driving circuit 130 of FIG. 1 may receive main image data about a main image (hereinafter referred to as "combination image") configured with a plurality of images from a first processor 110 or a second processor 120 of FIG. 1. The combination image may be an image in which the display driving circuit 130 may generate an additional image by selecting some of the plurality of images. The combination image may have a form of combining images such as a numeral, an alphabet, a date, a weather icon, a call icon, and a text icon in a specified order.

In operation 720, the display driving circuit 130 may receive a control signal including image selection information from the first processor 110 or the second processor 120. The image selection information may be information for selecting at least some of the plurality of images included in the combination image. In various embodiments, the image selection information may include a data address, a data size of an image, and the like on a graphic RAM 220 of FIG. 2.

In operation 730, the display driving circuit 130 may select some (hereinafter referred to as "output image") of the plurality of images included in the combination image based on the image selection information. For example, the display driving circuit 130 may select the output image to include time information, weather information, and temperature information.

In operation 740, the display driving circuit 130 may output the selected output image on a display panel 150 of FIG. 1. In various embodiments, the display driving circuit 130 may continue outputting the output image, for example, may implement an always-on display. In various embodiments, the display driving circuit 130 may set a specified image (e.g., at least one included in the combination image) to the main image, may combine the output image with the main image, and may output the combined image on the display panel 150.

Figure 8:
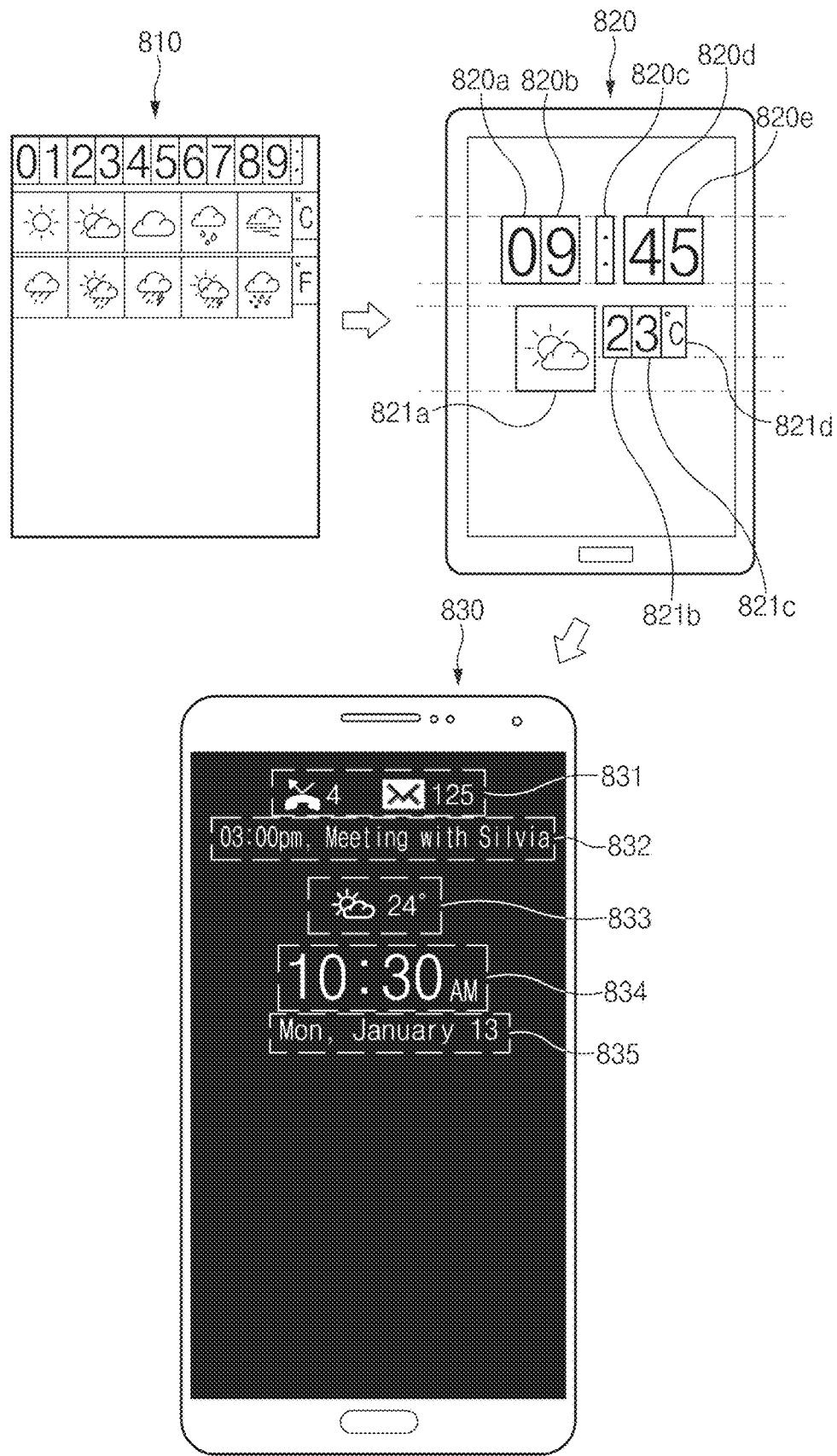
FIG. 8 is a screen illustrating a process of extracting and outputting a partial image from a combination image configured with a plurality of images according to an embodiment of the present disclosure.

FIG. 8 is a screen illustrating a process of extracting and outputting a partial image from a combination image configured with a plurality of images according to an embodiment of the present disclosure.

Referring to FIG. 8, a display driving circuit 130 of FIG. 1 may receive main image data about a combination image 810 from a first processor 110 or a second processor 120 of FIG. 1. The combination image 810 may have a form of combining images such as a numeral, an alphabet, a date, a weather icon, a call icon, and a text icon in a specified order.

The display driving circuit 130 may receive a control signal including image selection information from the first processor 110 or the second processor 120. The image selection information may be information for selecting at least some of the plurality of images included in the combination image.

For one example, the display driving circuit 130 may receive a control signal for outputting a digital watch, may select some (e.g., hour information 820a and 820b, classification information 820c, minute information 820d and 820e, and the like) of images included in the combination image 810, and may implement the digital watch. The control signal may include information about a location or size where the digital watch is displayed on a screen.

For another example, the display driving circuit 130 may receive a control signal including weather information and temperature information via a sensor hub and may combine and output a weather icon 821a, temperature number values 821d and 821c, a temperature unit 821d, and the like.

According to various embodiments, the display driving circuit 130 may receive a control signal including communication related information via a CP and may display a missed call and message reception information 831. The display driving circuit 130 may display schedule information 832, weather information 833, a digital watch 834, date information 835, and the like on a display panel 150 of FIG. 1.

In FIG. 8, an embodiment is exemplified as the output image 830 is displayed in a screen sleep state. However, embodiments are not limited thereto. The display driving circuit 130 may seta specified image (e.g., at least one included in the combination image 810) to a main image, may combine the output image with the main image, and may output the combined image on the display panel 150.

Figure 9A:
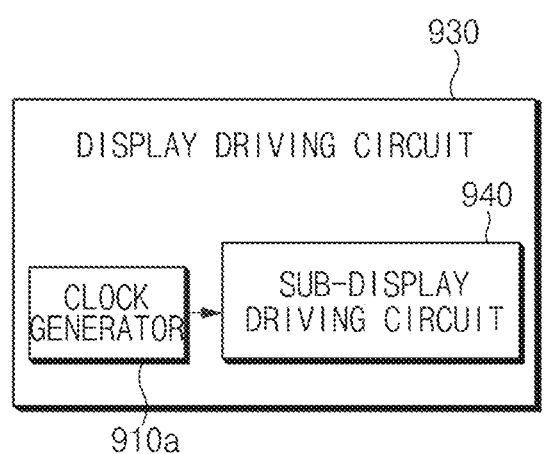
FIGS. 9A and 9B are block diagrams illustrating a configuration of a display driving circuit which performs time calculation according to various embodiments of the present disclosure.
Figure 9B:
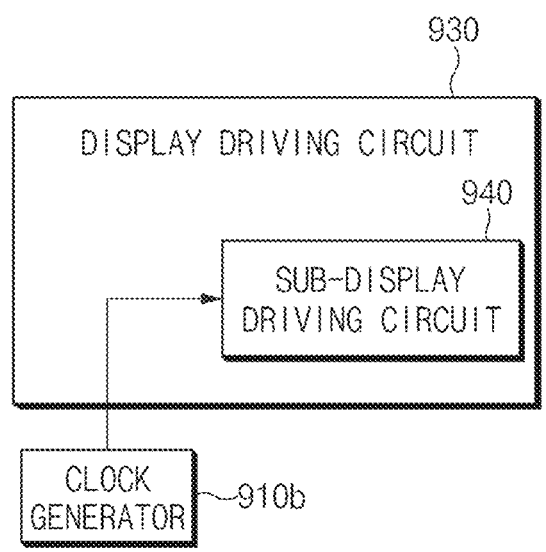

FIGS. 9A and 9B are block diagrams illustrating a configuration of a display driving circuit which performs tune calculation according to various embodiments of the present disclosure.

Referring to FIG. 9A, a display driving circuit 930 may include a sub-display driving circuit 940 and a clock generator 910a. The sub-display driving circuit 940 may receive a signal for a time change of a second hand from the clock generator 910a. The clock generator 910a may include an element such as a crystal resonator.

The display driving circuit 930 may receive a main image including time information of hour and minute units via a first channel from a first processor. For example, the display driving circuit 930 may receive main image data for an image, on which an hour and minute of a digital watch is displayed, at intervals of one minute from an AP.

The sub-display driving circuit 940 may receive a signal every second from the clock generator 910a with reference to a time when the main image data is received. The sub-display driving circuit 940 may generate an additional image based on a signal generated from the clock generator 910a. The display driving circuit 930 may combine the additional image with a main image generated based on the main image data and may output the combined image.

The display driving circuit 930 may perform calculation of a second hand and may display a watch. The first processor or the second processor may not send main image data about a separate main image to the display driving circuit 930 for one minute.

A form of a watch output via the display driving circuit 930 may be one of a digital form, an analog form, or a form of simultaneously displaying the digital watch and the analog watch. Additional information about the method for implementing the watch of the second hand via the display driving circuit 130 will be provided with reference to FIGS. 10, 11, 12, 13, 14 and 15.

Referring to FIG. 9B, a clock generator 910b may be arranged outside the display driving circuit 930. For example, the clock generator 910b may be arranged in the first processor or the second processor or may be arranged in a chip around the display driving circuit 930. In this case, the display driving circuit 930 may receive a control signal every second over a second channel from the clock generator 910b. The display driving circuit 930 may perform calculation of a second hand based on the control signal and may generate additional image. The generated additional image may be combined and output with a main image of hour and minute units.

According to various embodiments, the clock generator 910b may be included in the first processor or the second processor. The first processor or the second processor including the clock generator 910b may perform calculation of a second hand and may provide a control signal including the calculated result to the display driving circuit 930 over the second channel. In this case, the display driving circuit 930 may combine additional image generated based on the control signal with a main image including hour/minute information without separate calculation of a second hand and may output the combined image. In various embodiments, it is impossible for the display driving circuit 930 to perform decimal point operation, it may include the clock generator 910b and may perform calculation about a location of a second hand of an analog watch via a processor (e.g., a touch control circuit) which may perform the decimal point operation.

For example, the touch control circuit may perform calculation for a second hand through decimal point operation using an angle. The touch control circuit may provide the calculated result (e.g., information about a location of a pixel, a color of which is changed) to the display driving circuit 930. The sub-display driving circuit 940 of the display driving circuit 930 may generate an additional image based on the calculated result.

Figure 10:
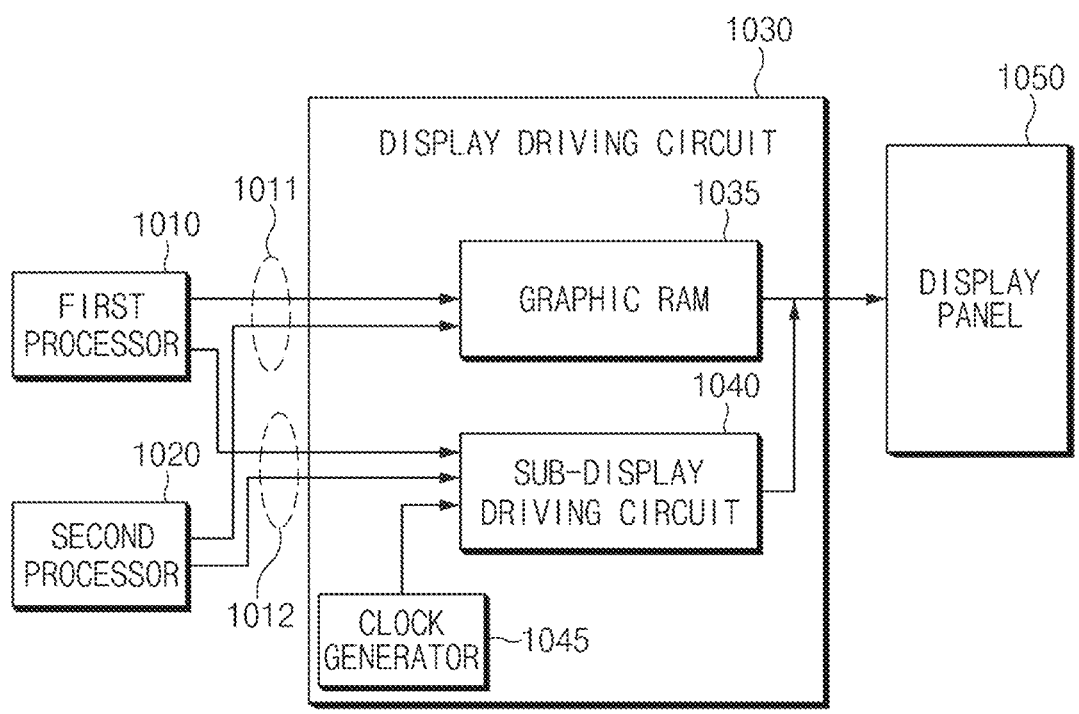
FIG. 10 is a block diagram illustrating a configuration of an electronic device for configuring a watch of a second hand according to an embodiment of the present disclosure.

FIG. 10 is a block diagram illustrating a configuration of an electronic device for configuring a watch of a second hand according to an embodiment of the present disclosure. In FIG. 10, an embodiment is exemplified as it is described that a clock generator is arranged in a display driving unit. However, embodiments are not limited thereto. For example, it is applied that the clock generator is arranged outside the display driving circuit.

Referring to FIG. 10, a first processor 1010 or a second processor 1020 may provide a main image including hour/minute information of a watch to a display driving circuit 1030 over a first channel 1011. For example, the display driving circuit 1030 may receive main image data for an image, on which an hour and minute of a digital watch is displayed, at intervals of one minute from an AP. The main image data may be stored in a graphic RAM 1035. The display driving circuit 1030 may not receive separate main image data for one minute from the first processor 1010 or the second processor 1020.

The sub-display driving circuit 1040 may receive a signal every second from a clock generator 1045 with reference to a specified time (e.g., a time when the main image data is received, a time when the main image data is stored in the graphic RAM 1035, or a time when a separate control signal is received). The sub-display driving circuit 1040 may perform calculation of a second hand based on a signal generated from the clock generator 1045 and may generate an additional image including the calculated result.

The display driving circuit 1030 may combine an additional image including information of a second hand with a main image including information of an hour/minute unit and may output the combined image. The main image may be updated at intervals of one minute, and the additional image may be updated at intervals of one second.

Figure 11:
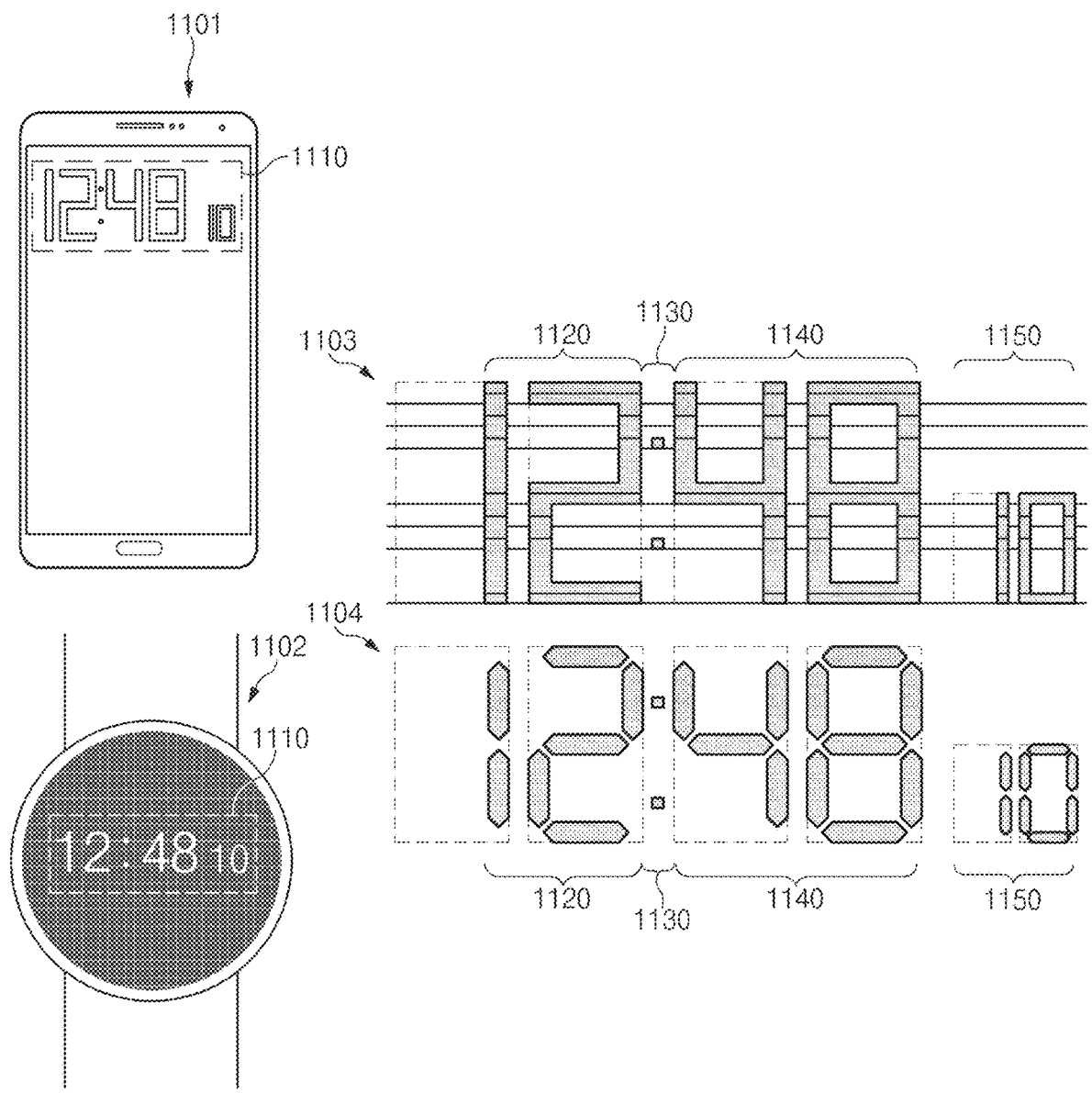
FIG. 11 is a drawing illustrating an implementation example of a digital watch of a second hand via a digital driving circuit according to an embodiment of the present disclosure.
Figure 12:
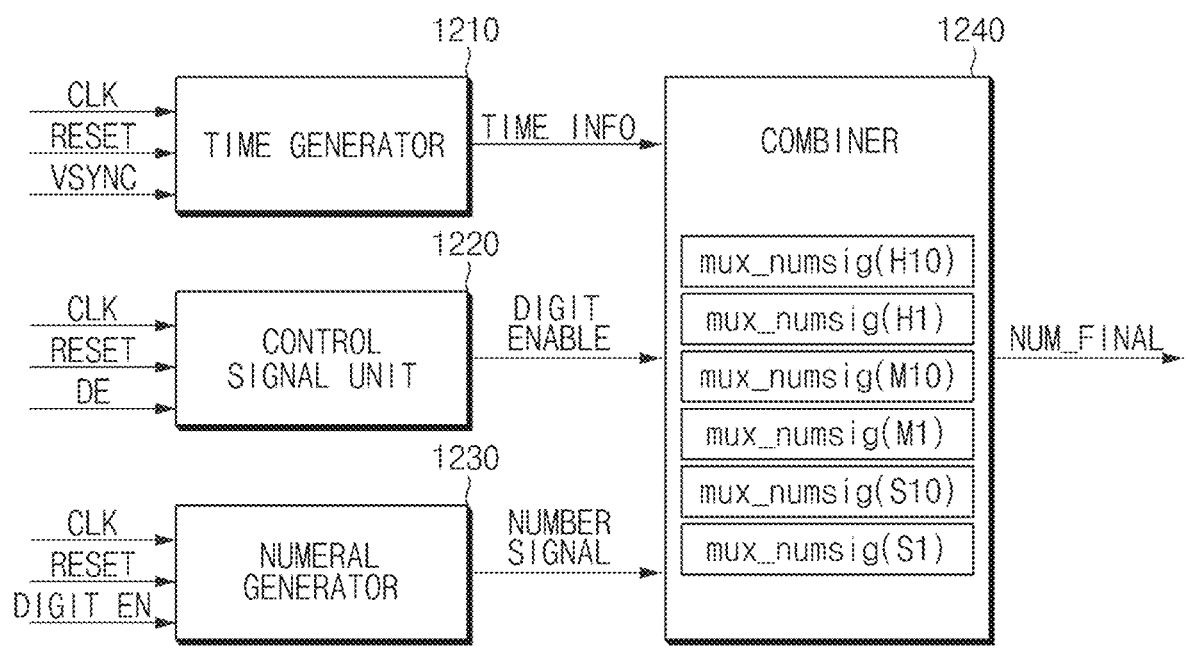
FIG. 12 is a block diagram illustrating a process of outputting a digital watch in a sub-display driving circuit according to an embodiment of the present disclosure.

Information about implementing a digital watch via the display driving circuit 1030 will be provided with reference to FIGS. 11 and 12. Information about implementing an analog watch will be provided with reference to FIGS. 13 to 15.

FIG. 11 is a drawing illustrating an implementation example of a digital watch of a second hand via a digital driving circuit according to an embodiment of the present disclosure.

Referring to FIG. 11, a digital watch 1110 of a second hand may be implemented in an electronic device 1101 such as a smartphone or an electronic device 1102 such as a smart watch. An hour/minute unit may be output based on main image data provided from a first processor 1010 (e.g., an AP) or a second processor 1020 (e.g., a CP) in the electronic device 1101 or 1102. The second hand may be output based on a signal generated by a display driving circuit 1030 of FIG. 10.

If the display driving circuit 1030 performs all of calculation of an hour/minute/second hand, an amount of calculation may depart from a degree to which calculation may be performed by the display driving circuit 1030. Incorrect time information may be provided to a user due to a time error of a clock generator 1045 of FIG. 10. Since the display driving circuit 1030 performs calculation of a second hand for one minute and since the first processor 1010 or the second processor 1020 performs calculation of an hour/minute unit, the electronic device 1101 or 1102 may reduce a time error which may occur.

The digital watch 1110 may be classified into an hour display region 1120 (two digits), a classification region 1130, a minute display region 1140 (two digits), and a second display region 1150 (two digits). In various embodiments, the digital watch 1110 may be implemented with a watch 1103 of a row division type or a watch 1104 of a seven-segment type. However, embodiments are not limited thereto. For example, various types of digital watches may be applied to the digital watch 1110.

According to various embodiments, at least part of the hour display region 1120, the classification region 1130, or the minute display region 1140 may be output through an additional image generated by the sub-display driving unit 1040. For one example, the classification region 1130 may be repeatedly turned on/off at intervals of one second through an additional image generated by the sub-display driving circuit 1040. For another example, the minute display region 1140 and the second display region 1150 may be configured to be output at intervals of a specified time (e.g., five minutes) through additional image.

FIG. 12 is a block diagram illustrating a process of outputting a digital watch in a sub-display driving circuit according to an embodiment of the present disclosure.

Referring to FIG. 12, a sub-display driving circuit 1040 of FIG. 10 may include a time generator 1210, a control signal unit 1220, a numeral generator 1230, and a combiner 1240. The time generator 1210 may provide time information to the combiner 1240. The control signal unit 1220 may provide an enable signal to the combiner 1240. A numeral generator 1230 may provide numerals which configures a digital watch to the combiner 1240. The combiner 1240 may output the digital watch by combining the signals provided from the time generator 1210, the control signal unit 1220, and the numeral generator 1230.

According to various embodiments, the sub-display driving circuit 1040 may be configured to perform only calculation of a second hand using the time generator 1210, the control signal unit 1220, the numeral generator 1230, and the combiner 1240. A display driving circuit 1030 of FIG. 10 may receive main image data on which information about an hour/minute is displayed from a first processor 1010 or a second processor 1020 of FIG. 10. The sub-display driving circuit 1040 may generate an additional image including information of a second hand, may combine the generated additional image with the main image data, and may output the combined image.

Figure 13:
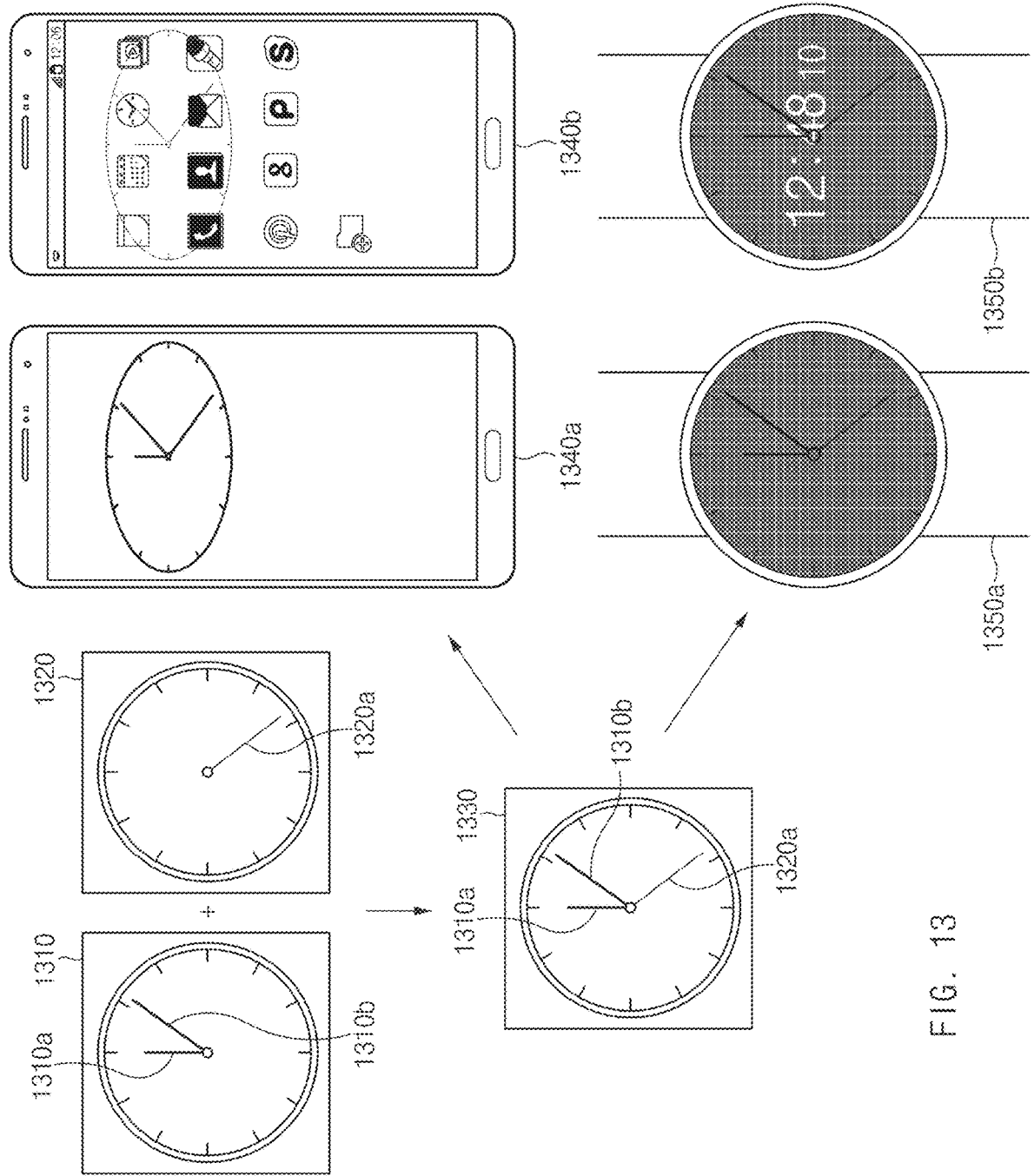
FIG. 13 is a drawing illustrating an implementation example of an analog watch according to an embodiment of the present disclosure.

FIG. 13 is a drawing illustrating an implementation example of an analog watch according to an embodiment of the present disclosure.

Referring to FIG. 13, a main image 1310 may include hour information (hour hand) 1310a and minute information (minute hand) 1310b. The main image 1310 may be provided to a display driving circuit 1030 of FIG. 10 over a first channel 1011 of FIG. 10 from a first processor 1010 or a second processor 1020 of FIG. 10. In various embodiments, the main image 1310 may be updated at intervals of a specified time (e.g., one minute).

An additional image 1320 may include second information (second hand) 1320a. The additional image 1320 may be generated via a sub-display driving circuit 1040 and a clock generator 1045 in the display driving circuit 1030.

The display driving circuit 1030 may combine the main image 1310 with the additional image 1320 and may output an analog watch 1330 on a display panel 1050 of FIG. 10. The analog watch 1330 may be output in a state such as a state 1340a where a screen of an electronic device such as a smartphone is turned off (e.g., a state where the other pixels except for the analog watch 1330 are turned off) or a state 1340b where the analog watch 1330 is output together with a home screen. Alternatively, the analog watch 1330 may be output in a state such as a watch output state 1350a of an electronic device such as a smart watch or a state 1350b where the analog watch 1330 is output together with a digital watch.

Figure 14:
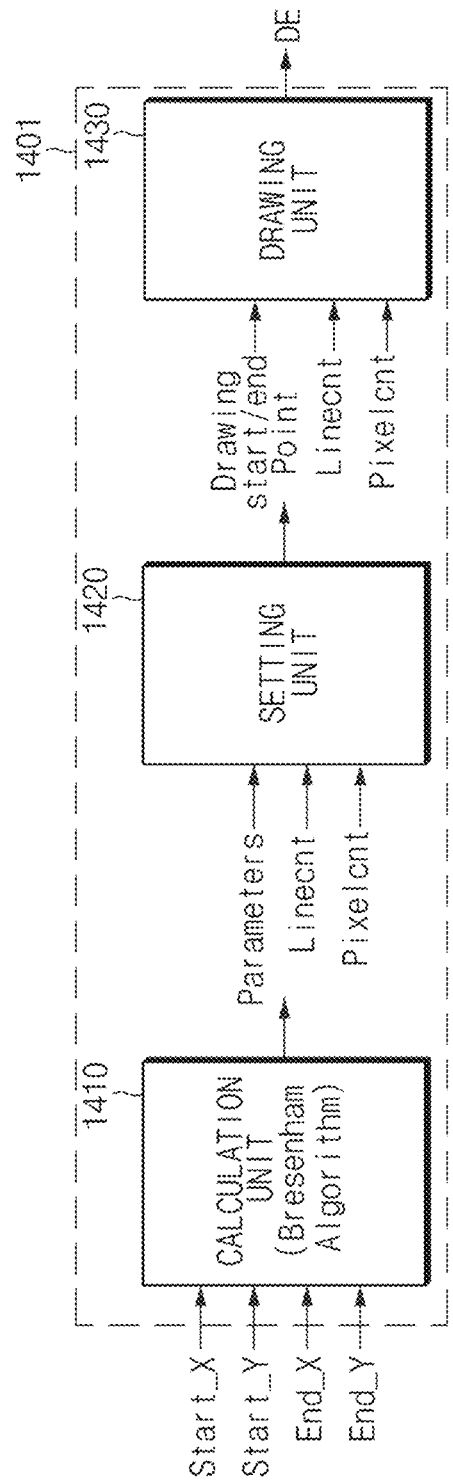
FIG. 14 is a block diagram illustrating a detailed configuration of a sub-display driving circuit for implementing an analog watch according to an embodiment of the present disclosure.

FIG. 14 is a block diagram illustrating a detailed configuration of a sub-display driving circuit for implementing an analog watch according to an embodiment of the present disclosure.

Referring to FIG. 14, a sub-display driving circuit 1401 may include a calculation unit 1410, a setting unit 1420, and a drawing unit 1430.

The calculation unit 1410 may receive coordinates Start_X, Start_Y, End_X, and End_Y for information about a start point and an end point to draw a second hand and may calculate parameters (e.g., a slope, change amounts dy and dx, and the like) necessary for applying a specified algorithm (e.g. a Bresenham algorithm). The calculation unit 1410 may set a start point and an end point again such that an upper end or a left side becomes the start point in consideration of a direction where data is drawn. If the slope among the parameters is positive, an absolute value of the slope may be reset as a segment having the same negative slope.

The setting unit 1420 may calculate determination parameters to be quicker than the drawing unit 1430 by one line and may store pixel information necessary for drawing a second hand. An coordinate of a start/end point may be stored in a variable in each line. The setting unit 1420 may update star/lend point information in the end of every line to use information about a start/end point stored to be quicker than the drawing unit 1430 by one line in an actually drawn next line.

The drawing unit 1430 may set an output value DE as a high level when passing through a coordinate using the corresponding coordinate for a start/end point. The drawing unit 1430 may apply the coordinate to a segment with a negative slope which is identical to a direction where data is drawn without change. Conversely, the drawing unit 1430 may generate an output value DE by resetting a start/end point in consideration of a max width.

Figure 15:
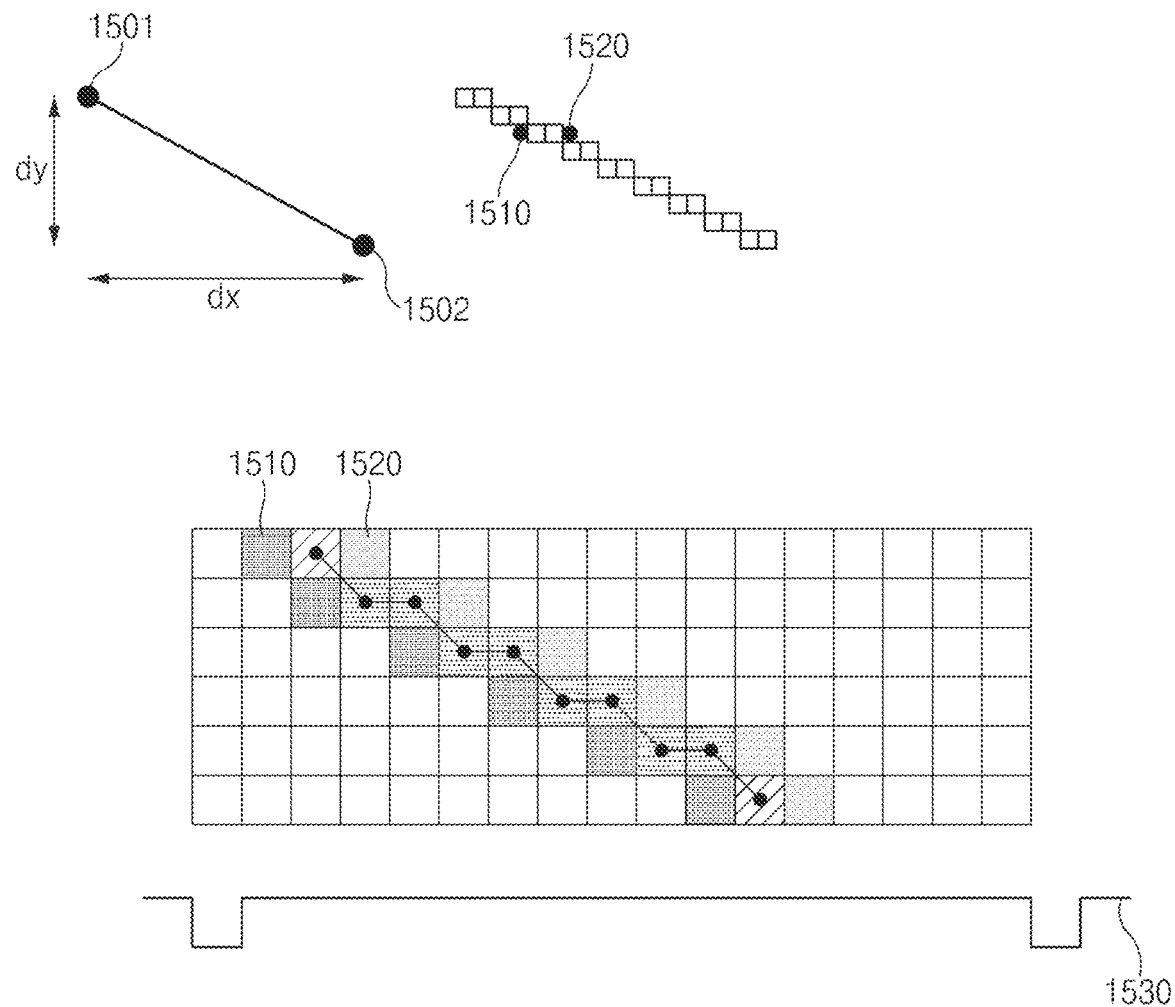
FIG. 15 is a drawing illustrating a second hand drawing method using a Bresenham algorithm according to an embodiment of the present disclosure.

FIG. 15 is a drawing illustrating a second hand drawing method using a Bresenham algorithm according to an embodiment of the present disclosure. For example, an algorithm using another integer calculation may be used to draw a second hand.

Referring to FIG. 15, a sub-display driving circuit 1401 of FIG. 14 may set a start point 1501 of a second hand and an end point 1502 of the second hand. The sub-display driving circuit 1401 may calculate change amounts dx and dy between the start point 1501 and the end point 1502 of the second hand.

The sub-display driving circuit 1401 may determine a start point 1510 and an end point 1520 for each line of a pixel based on a clock signal 1530 provided to the sub-display driving circuit 1401.

The number of pixels, colors of which are changed from a start point of a first column, may be determined based on the change amounts dx and dy. A start point of a second column may be the same as an end point of the first column (or a previous point of the end point of the first column) in x-coordinate.

According to various embodiments, a method for operating an electronic device, the method may include receiving, by a display driving circuit of the electronic device, main image data over a first channel from a first processor or a second processor of the electronic device, outputting, by the display driving circuit, a main image on a display panel of the electronic device based on the main image data, generating, by the display driving circuit, an additional image different from the main image, merging, by the display driving circuit, the main image with the additional image, and outputting, by the display driving circuit, the merged image on the display panel.

According to various embodiments, the generating of the additional image may include generating the additional image associated with the main image data.

According to various embodiments, the generating of the additional image may include receiving, by the display driving circuit, a control signal over a second channel from the first processor or the second processor, and generating, by the display driving circuit, the additional image based on the control signal.

According to various embodiments, the generating of the additional image may include generating an additional image including a graphic symbol or icon of a type associated with an application which generates the main image data.

According to various embodiments, the generating of the additional image may include generating the additional image based on a coordinate value on a screen, the coordinate value included in the control signal.

According to various embodiments, the generating of the additional image may include changing at least one of luminance, saturation, or a hue of pixels of a range relative to the coordinate value in the main image data.

According to various embodiments, the generating of the additional image may include performing anti-aliasing processing for a peripheral region of the pixels.

According to various embodiments, the generating of the additional image may include generating a cursor image which is turned on/off at intervals of a time relative to the coordinate value in the main image data.

According to various embodiments, the generating of the additional image may include changing an output of the additional image on a frame-by-frame basis.

According to various embodiments, the method for operating the electronic device may further include receiving updated main image data including the additional image from the first processor or the second processor, and outputting the main image based on the updated main image data and stopping outputting of the additional image.

According to various embodiments, the receiving of the main image data may include receiving the main image data from an AP of the electronic device, and the receiving of the control signal may include receiving the control signal from at least one of a CP, a touch control circuit, a touch pen control circuit, or a sensor hub of the electronic device.

According to various embodiments, the receiving of the main image data may include receiving the main image data via an HiSSI, and the receiving of the control signal may include receiving the control signal via an LoSSI.

According to various embodiments, the receiving of the main image data may include receiving main image data including hour information and minute information of a digital watch or an analog watch.

According to various embodiments, the generating of the additional image may include generating an additional image including second information associated with the main image data. The outputting of the main image on the display panel may include outputting a digital watch or an analog watch of a second hand by merging the main image based on the main image data with the additional image. The outputting of the digital watch or the analog watch may include outputting the digital watch or the analog watch during a time or while power is supplied to the electronic device. The generating of the additional image may include generating the additional image based on a signal generated every second by a clock generator in the display driving circuit.

According to various embodiments, the outputting of the main image data on the display panel may include outputting the digital watch with one of a row division type or a seven-segment type. The outputting of the main image data on the display panel may include drawing a second hand image of the analog watch using a line drawing method according to a Bresenham algorithm.

Figure 16:
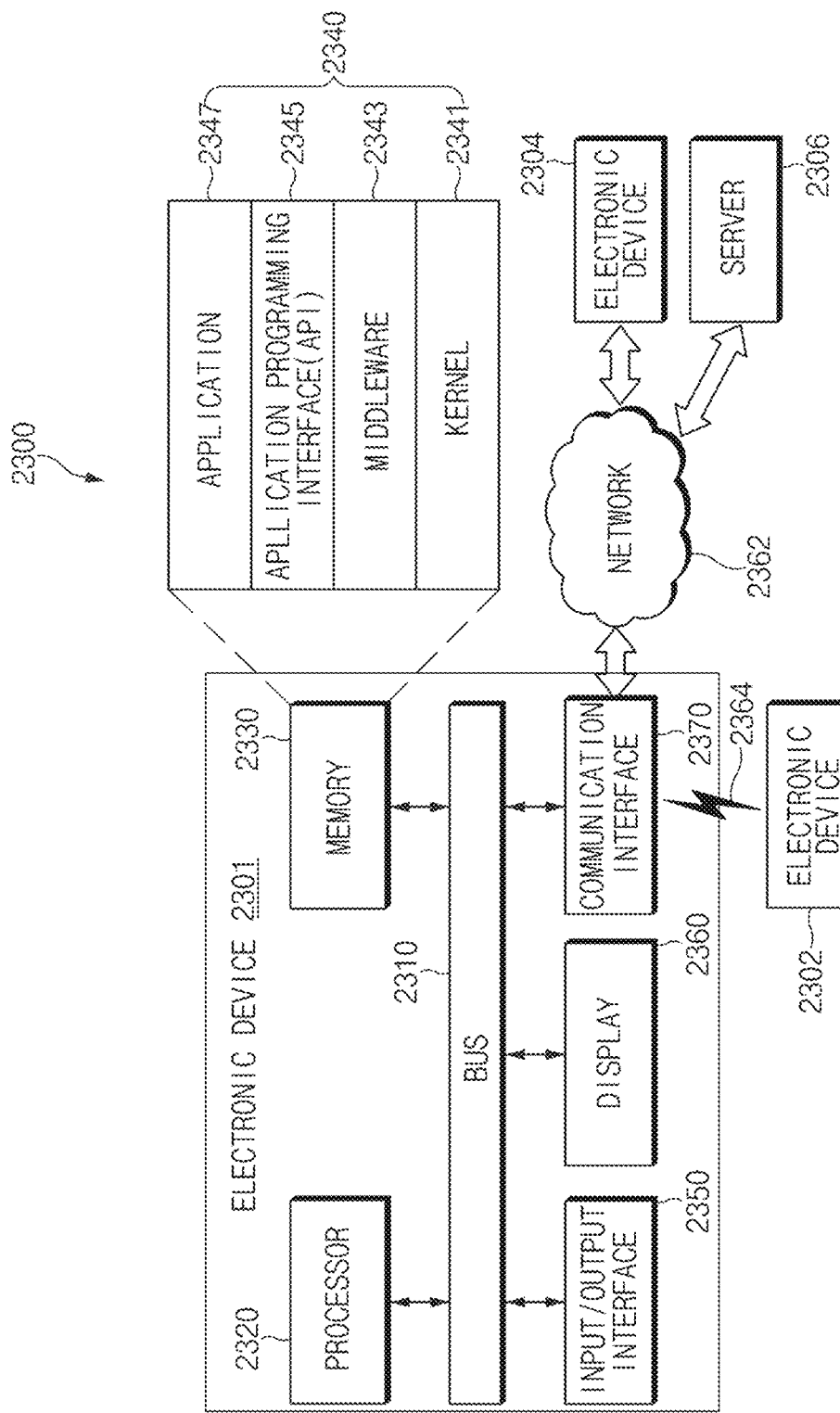
FIG. 16 is a block diagram illustrating a configuration of an electronic device in a network environment according to an embodiment of the present disclosure.

FIG. 16 is a diagram illustrating an electronic device in a network environment, according to an embodiment of the present disclosure.

Referring to FIG. 16, there is illustrated an electronic device 2301 in a network environment 2300 according to various embodiments. The electronic device 2301 may include a bus 2310, a processor 2320, a memory 2330, an input/output (I/O) I/F 2350, a display 2360, and a communication I/F 2370. According to an embodiment, the electronic device 2301 may not include at least one of the above-described elements or may further include other element(s).

For example, the bus 2310 may interconnect the above-described elements 2320 to 2370 and may include a circuit for conveying communications (e.g., a control message and/or data) among the above-described elements.

The processor 2320 (e.g., the processor 110 of FIG. 1) may include one or more of a CPU, an AP, or a CP. The processor 2320 may perform, for example, data processing or an operation associated with control and/or communication of at least one other element(s) of the electronic device 2301.

The memory 2330 (e.g., the memory 160 of FIG. 1) may include a volatile and/or nonvolatile memory. For example, the memory 2330 may store instructions or data associated with at least one other element(s) of the electronic device 2301. According to an embodiment, the memory 2330 may store software and/or a program 2340. The program 2340 may include, for example, a kernel 2341, a middleware 2343, an application programming interface (API) 2345, and/or an application program (or "application") 2347. At least a part of the kernel 2341, the middleware 2343, or the API 2345 may be called an "operating system (OS)".

The kernel 2341 may control or manage system resources (e.g., the bus 2310, the processor 2320, the memory 2330, and the like) that are used to execute operations or functions of other programs (e.g., the middleware 2343, the API 2345, and the application program 2347). Furthermore, the kernel 2341 may provide an I/F that allows the middleware 2343, the API 2345, or the application program 2347 to access discrete elements of the electronic device 2301 so as to control or manage system resources.

The middleware 2343 may perform a mediation role such that the API 2345 or the application program 2347 communicates with the kernel 2341 to exchange data.

Furthermore, the middleware 2343 may process one or more task requests received from the application program 2347 according to a priority. For example, the middleware 2343 may assign the priority, which makes it possible to use a system resource (e.g., the bus 2310, the processor 2320, the memory 2330, or the like) of the electronic device 2301, to at least one of the application program 2347. For example, the middleware 2343 may process the one or more task requests according to the priority assigned to the at least one, which makes it possible to perform scheduling or load balancing on the one or more task requests.

The API 2345 may be an I/F through which the application 2347 controls a function provided by the kernel 2341 or the middleware 2343, and may include, for example, at least one I/F or function (e.g., an instruction) for a file control, a window control, image processing, a character control, or the like.

The I/O interface 2350 may transmit an instruction or data, input from a user or another external device, to other element(s) of the electronic device 2301. Furthermore, the I/O interface 2350 may output an instruction or data, received from other element(s) of the electronic device 2301, to a user or another external device.

The display 2360 may include, for example, a liquid crystal display (LCD), an LED display, an OLED display, or a microelectromechanical systems (MEMS) display, or an electronic paper display. The display 2360 may display, for example, various kinds of content (e.g., a text, an image, a video, an icon, a symbol, and the like) to a user. The display 2360 may include a touch screen and may receive, for example, a touch, gesture, proximity, or hovering input using an electronic pen or a portion of a user's body.

The communication I/F 2370 may establish communication between the electronic device 2301 and an external device (e.g., a first external electronic device 2302, a second external electronic device 2304, or a server 2306). For example, the communication I/F 2370 may be connected to a network 2362 through wireless communication or wired communication to communicate with an external device (e.g., the second external electronic device 2304 or the server 2306).

The wireless communication may include at least one of for example, long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), or the like, as cellular communication protocol. Furthermore, the wireless communication may include, for example, a local area network 2364. The local area network 2364 may include at least one of a Wi-Fi, a near field communication (NEC), or a GNSS, or the like. The GNSS may include at least one of a global positioning system (GPS), a global navigation satellite system (GLONASS), BeiDou navigation satellite system (hereinafter referred to as "BeiDou"), the European global satellite-based navigation system (Galileo), or the like. In this specification, "GPS" and "GNSS" may be interchangeably used. The wired communication may include at least one of, for example, a universal serial bus (USB), a high definition multimedia interface (HMO, a recommended standard-232 (RS-232), a plain old telephone service (POTS), or the like. The network 2362 may include at least one of telecommunications networks, for example, a computer network (e.g., local area network (LAN) or wide area network (WAN)), an internet, or a telephone network.

Each of the first and second external electronic devices 2302 and 2304 may be a device of which the type is different from or the same as that of the electronic device 2301. According to an embodiment, the server 2306 may include a group of one or more servers. According to various embodiments, all or a portion of operations that the electronic device 2301 will perform may be executed by another or plural electronic devices (e.g., the electronic devices 2302 and 2304 or the server 2306). According to an embodiment, in the case where the electronic device 2301 executes any function or service automatically or in response to a request, the electronic device 2301 may not perform the function or the service internally, but, alternatively additionally, it may request at least a part of a function associated with the electronic device 101 at other device (e.g., the electronic device 2302 or 2304 or the server 2306). The other electronic device (e.g., the electronic device 2302 or 2304 or the server 2306) may execute the requested function or additional function and may transmit the execution result to the electronic device 2301. The electronic device 2301 may provide the requested function or service using the received result or may additionally process the received result to provide the requested function or service. To this end, for example, cloud computing, distributed computing, or client-server computing may be used.

Figure 17:
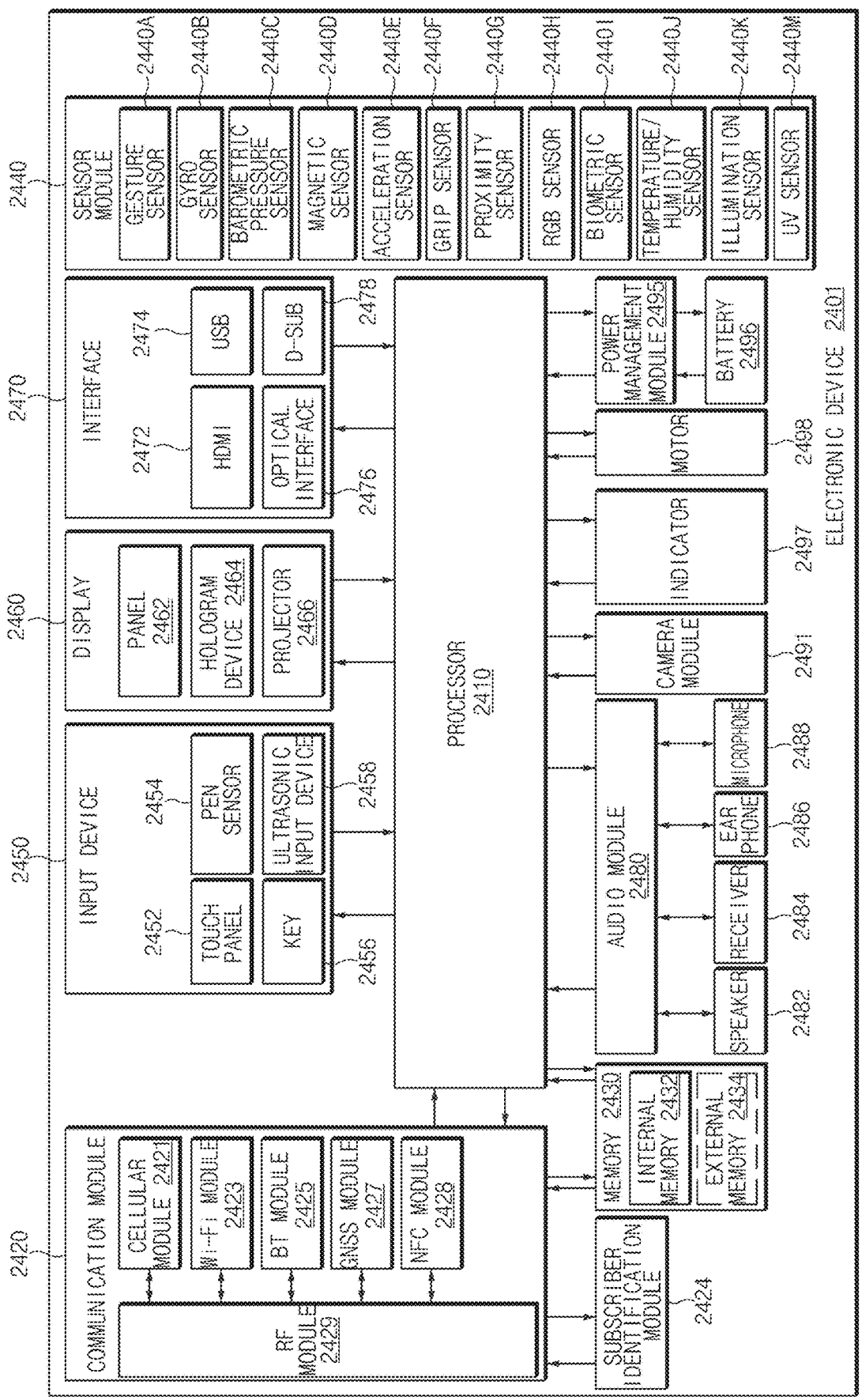
FIG. 17 is a block diagram illustrating a configuration of an electronic device according to an embodiment of the present disclosure.

FIG. 17 is a block diagram of an electronic device according to an embodiment of the present disclosure.

Referring to FIG. 17, an electronic device 2401 may include, for example, all or a part of the electronic device 241 illustrated in FIG. 1. The electronic device 2401 may include one or more processors (e.g., an AP) 2410, a communication module 2420, a subscriber identification module (SIM) 2424, a memory 2430, a sensor module 2440, an input device 2450, a display 2460, an IT 2470, an audio module 2480, a camera module 2491, a power management module 2495, a battery 2496, an indicator 2497, and a motor 2498.

The processor 2410 may drive an OS or an application to control a plurality of hardware or software elements connected to the processor 2410 and may process and compute a variety of data. The processor 2410 may be implemented with a system on chip (SoC), for example. According to an embodiment, the processor 2410 may further include a graphics processing unit (GPU) and/or an image signal processor. The processor 2410 may include at least a part (e.g., a cellular module 2421) of elements illustrated in FIG. 17. The processor 2410 may load and process an instruction or data, which is received from at least one of other elements (e.g., a nonvolatile memory) and may store a variety of data in a nonvolatile memory.

The communication module 2420 may be configured the same as or similar to the communication I/F 2370 of FIG.

16. The communication module 2420 may include a cellular module 2421, a Wi-Fi module 2423, a Bluetooth (BT) module 2425, a GNSS module 2427 (e.g., a GPS module, a GLONASS module, a BeiDou module, or a Galileo module), an NFC module 2428, and a radio frequency (RF) module 2429.

The cellular module 2421 may provide voice communication, video communication, a message service, an internet service or the like through a communication network. According to an embodiment, the cellular module 2421 may perform discrimination and authentication of the electronic device 2401 within a communication network using the SIM 2424 (e.g., a SIM card), for example. According to an embodiment, the cellular module 2421 may perform at least a portion of functions that the processor 2410 provides. According to an embodiment, the cellular module 2421 may include a CP.

Each of the Wi-Fi module 2423, the BT module 2425, the GNSS module 2427, and the NFC module 2428 may include a processor for processing data exchanged through a corresponding module, for example. According to an embodiment, at least a part (e.g., two or more elements) of the cellular module 2421, the Wi-Fi module 2423, the BT module 2425, the GNSS module 2427, or the NFC module 2428 may be included within one IC or an IC package.

The RF module 2429 may transmit and receive, for example, a communication signal (e.g., an RF signal). The RF module 2429 may include, for example, a transceiver, a power amplifier module (PAM), a frequency filter, a low noise amplifier (LNA), an antenna, or the like. According to an embodiment, at least one of the cellular module 2421, the Wi-Fi module 2423, the HT module 2425, the GNSS module 2427, or the NFC module 2428 may transmit and receive an RF signal through a separate RF module.

The SIM 2424 may include, for example, a card and/or embedded SIM that includes a SIM and may include unique identify information (e.g., IC card identifier (ICCID)) or subscriber information (e.g., international mobile subscriber identity (IMSI)).

The memory 2430 (e.g., the memory 2330) may include an internal memory 2432 or an external memory 2434. For example, the internal memory 2432 may include at least one of a volatile memory (e.g., a dynamic RAM (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, or a solid state drive (SSD).

The external memory 2434 may include a flash drive, for example, compact flash (CF), secure digital (SD), micro-SD, mini-SD, extreme digital (xD), multimedia card (MMC), a memory stick, or the like. The external memory 2434 may be functionally and/or physically connected with the electronic device 2401 through various I/Fs.

The sensor module 2440 may measure, for example, a physical quantity or may detect an operation state of the electronic device 2401. The sensor module 2440 may convert the measured or detected information to an electric signal. The sensor module 2440 may include at least one of a gesture sensor 2440A, a gyro sensor 2440B, a barometric pressure sensor 2440C, a magnetic sensor 2440D, an acceleration sensor 2440E, a grip sensor 2440F, a proximity sensor 2440G, a color sensor 2440H (e.g., red, green, blue (RGB) sensor), a biometric sensor 2440I, a temperature/humidity sensor 2440J, an illuminance sensor 2440K, or an ultraviolet (UV) sensor 2440M. Even though not illustrated, additionally or alternatively, the sensor module 2440 may include, for example, an E-nose sensor, an electromyography sensor (EMG), an electroencephalogram (EEG) sensor, an electrocardiogram (ECG) sensor, an infrared (IR) sensor, an iris sensor, and/or a fingerprint sensor. The sensor module 2440 may further include a control circuit for controlling at least one or more sensors included therein. According to an embodiment, the electronic device 2401 may further include a processor which is a part of the processor 2410 or independent of the processor 2410 and is configured to control the sensor module 2440. The processor may control the sensor module 2440 while the processor 2410 remains at a sleep state.

The input device 2450 may include, for example, a touch panel 2452, a (digital) pen sensor 2454, a key 2456, or an ultrasonic input unit 2458. The touch panel 2452 may use at least one of capacitive, resistive, infrared and ultrasonic detecting methods. Also, the touch panel 2452 may further include a control circuit. The touch panel 2452 may further include a tactile layer to provide a tactile reaction to a user.

The (digital) pen sensor 2454 may be, for example, a portion of a touch panel or may include an additional sheet for recognition. The key 2456 may include, for example, a physical button, an optical key, a keypad, or the like. The ultrasonic input device 2458 may detect (or sense) an ultrasonic signal, which is generated from an input device, through a microphone (e.g., a microphone 2488) and may check data corresponding to the detected ultrasonic signal.

The display 2460 (e.g., the display 2360) may include a panel 2462, a hologram device 2464, or a projector 2466. The panel 2462 may be configured the same as or similar to the display 2360 of FIG. 16. The panel 2462 may be implemented to be flexible, transparent or wearable, for example. The panel 2462 and the touch panel 2452 may be integrated into a single module. The hologram device 2464 may display a stereoscopic image in a space using a light interference phenomenon. The projector 2466 may project light onto a screen so as to display an image. The screen may be arranged inside or outside the electronic device 2401. According to an embodiment, the display 2460 may further include a control circuit for controlling the panel 2462, the hologram device 2464, or the projector 2466.

The I/F 2470 may include, for example, an HDMI 2472, a USB 2474, an optical I/F 2476, or a D-subminiature (D-sub) 2478. The I/F 2470 may be included, for example, in the communication I/F 2370 illustrated in FIG. 16. Additionally or alternatively, the I/F 2470 may include, for example, a mobile high definition link (MHL) I/F, an SD card/MMC I/F, or an infrared data association (IrDA) standard I/F.

The audio module 2480 may convert a sound and an electrical signal in dual directions. At least a part of the audio module 2480 may be included, for example, in the I/O interface 2350 illustrated in FIG. 16. The audio module 2480 may process, for example, sound information that is input or output through a speaker 2482, a receiver 2484, an earphone 2486, or a microphone 2488.

The camera module 2491 for shooting a still image or a video may include, for example, at least one image sensor (e.g., a front sensor or a rear sensor), a lens, an image signal processor (ISP), or a flash (e.g., an LED or a xenon lamp).

The power management module 2495 may manage, for example, power of the electronic device 2401. According to an embodiment, a power management IC (PMIC) a charger IC, or a battery or fuel gauge may be included in the power management module 2495. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 2496 and a voltage, current or temperature thereof while the battery is charged. The battery 2496 may include, for example, a rechargeable battery or a solar battery.

The indicator 2497 may display a specific state of the electronic device 2401 or a part thereof (e.g., the processor 2410), such as a booting state, a message state, a charging state, and the like. The motor 2498 may convert an electrical signal into a mechanical vibration and may generate a vibration effect, a haptic effect, or the like. Even though not illustrated, a processing device (e.g., a GPU) for supporting a mobile TV may be included in the electronic device 2401. The processing device for supporting a mobile TV may process media data according to the standards of digital multimedia broadcasting (DMB), digital video broadcasting (DVB), MediaFlo™, or the like.

Each of the above-mentioned elements may be configured with one or more components, and the names of the elements may be changed according to the type of the electronic device. The electronic device according to various embodiments may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

According to various embodiments, an electronic device may include a first processor, a second processor configured to be independent of the first processor and to perform calculation for a function, a display driving circuit, and a display panel, wherein the display driving circuit receives main image data over a first channel from the first processor or the second processor and outputs a main image based on the main image data, and wherein the display driving circuit generates an additional image different from the main image, merges the main image with the additional image, and outputs the merged image on the display panel.

According to various embodiments, the display driving circuit receives a control signal over a second channel from the first processor or the second processor and generates the additional image based on the control signal.

According to various embodiments, the display driving circuit may include an I/F module configured to receive data from the first processor or the second processor, a sub-display driving circuit configured to generate the additional image, a multiplexer configured to merge the main image with the additional image, and a source driver and a gate driver configured to drive the display panel.

According to various embodiments, the display driving circuit may further include a first graphic RAM configured to store the main image data, and an image processing module configured to convert the main image data.

According to various embodiments, the I/F module may include a high speed I/F configured to receive the main image data, and a low speed I/F configured to receive a control signal from the first processor or the second processor.

According to various embodiments, the display driving circuit may further include a clock generator configured to provide a clock signal to the sub-display driving circuit.

According to various embodiments, the sub-display driving circuit may include a second graphic RAM configured to be independent of the first graphic RAM, and the second graphic RAM stores at least part of the main image data.

According to various embodiments, the sub-display driving circuit may further include a magnification adjusting unit configured to adjust a magnification of the image data stored in the second graphic RAM.

According to various embodiments, the sub-display driving circuit receives data corresponding to at least part of the main image data from at least one of the I/F module, the first graphic RAM, or the image processing module.

According to various embodiments, the sub-display driving circuit generates the additional image by adjusting an output form of the image data stored in the second graphic RAM.

According to various embodiments, the sub-display driving circuit determines a range of the main image data to be stored in the second graphic RAM in response to an input of a user of the electronic device.

According to various embodiments, the sub-display driving circuit dynamically changes the additional image in output size based on at least one of a type of the input or duration.

The term "module" used in this disclosure may represent, for example, a unit including one or more combinations of hardware, software and firmware. For example, the term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 2320), may cause the one or more processors to perform a function corresponding to the instruction. The computer-readable storage media, for example, may be the memory 2330.

The computer-readable storage media according to various embodiments may store a program for executing an operation in which a communication module receives an application package from an external device and provides the application package to a normal module of a processor, an operation in which the normal module determines whether a secure application is included in at least a portion of the application package, and an operation in which the secure module of the processor installs the secure application in the secure module or in a memory associated with the secure module.

The computer-readable storage media may include a hard disk, a floppy disk, a magnetic media (e.g., a magnetic tape), an optical media (e.g., a compact disc ROM (CD-ROM) and a DVD), a magneto-optical media (e.g., a floptical disk), and hardware devices (e.g., a ROM, a RAM, or a flash memory). Also, a program instruction may include not only a mechanical code such as things generated by a compiler but also a high-level language code executable on a computer using an interpreter. The above-mentioned hardware devices may be configured to operate as one or more software modules to perform operations according to various embodiments, and vice versa.

Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. Also, a part of operations may be executed in different sequences, omitted, or other operations may be added.

According to various embodiments, the display driving circuit of the electronic device may generate and output an additional image for providing additional information to the user through simple calculation.

According to various embodiments, the electronic device may reduce the number of times of driving the AP and may provide a fast response speed.

According to various embodiments, the electronic device may output a digital watch or an analog watch which may provide an output of a second hand, and may implement an always-on display by reducing the number of times of driving the AP and reducing battery consumption.

According to various embodiments, the electronic device may quickly output a zoomed-in image for a portion the user wants using the display driving circuit and may reduce the number of times of driving the AP or a time when the AP is driven.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device having a display panel, the method comprising:
   receiving at a first speed, by a display driving circuit to drive the display panel of the electronic device, main image data for a main image over a first channel from a first integrated circuit of the electronic device;
   receiving at a second speed, by the display driving circuit, a control signal over a second channel from a second integrated circuit of the electronic device, the control signal comprising anti-aliasing processing information;
   obtaining, by the display driving circuit, an additional image which is an anti-aliased image according to the control signal and is different from the main image;
   merging, by the display driving circuit, the main image with the additional image to form a merged image; and
   outputting, by the display driving circuit, the merged image on the display panel,
   wherein the first speed and the second speed are different.

2. The method of claim 1, wherein the obtaining of the additional image comprises:
   generating the additional image associated with the main image data.

3. The method of claim 1, wherein the obtaining of the additional image comprises:
   generating, by the display driving circuit, the additional image when at least one of the first integrated circuit or the second integrated circuit is in a sleep state.

4. The method of claim 3, wherein the obtaining of the additional image comprises:
   changing an output of the additional image on a frame-by-frame basis.

5. The method of claim 3, further comprising:
   receiving updated main image data including the additional image from the first integrated circuit;
   outputting the main image based on the updated main image data; and
   stopping outputting the merged image.

6. The method of claim 1, wherein the obtaining of the additional image comprises:
   generating an additional image including a graphic symbol or an icon of a type associated with an application which generates the main image data.

7. The method of claim 1, wherein the obtaining of the additional image comprises:
   generating the additional image based on a coordinate value on a screen, the coordinate value included in the control signal.

8. The method of claim 7, wherein the obtaining of the additional image comprises:
   generating a cursor image which is turned on/off at intervals of a time relative to the coordinate value in the main image data.

9. The method of claim 1, wherein the receiving of the main image data comprises:
   receiving main image data including hour information and minute information of a digital watch or an analog watch.

10. The method of claim 9, wherein the generating of the additional image comprises:
    generating an additional image including second information associated with the main image data.

11. The method of claim 10, wherein the outputting of the main image on the display panel comprises:
    outputting a second hand of a digital watch or an analog watch by merging the main image based on the main image data with the additional image.

12. The method of claim 11, wherein the outputting of the digital watch or the analog watch comprises:
    outputting the digital watch or the analog watch during a time or while power is supplied to the electronic device.

13. The method of claim 10, wherein the generating of the additional image comprises:
    generating the additional image based on a signal generated every second by a clock generator in the display driving circuit.

14. The method of claim 10, wherein the outputting of the main image data on the display panel comprises:
    drawing a second hand image of the analog watch using a line drawing method according to a Bresenham algorithm.

15. An electronic device comprising:
    a first integrated circuit;
    a second integrated circuit;
    a display panel; and
    a display driving circuit to drive the display panel,
    wherein the display driving circuit is configured to:
       receive, at a first speed, main image data for a main image over a first channel from the first integrated circuit, receive, at a second speed, a control signal over a second channel from the second integrated circuit, the control signal comprising anti-aliasing processing information, obtain an additional image which is an anti-aliased image according to the control signal and is different from the main image, merge the main image with the additional image to form a merged image, and output the merged image on the display panel, wherein the first speed and the second speed are different.

16. The electronic device of claim 15, wherein the display driving circuit comprises:

an interface configured to receive data from the at least one of the first integrated circuit or the second integrated circuit;

a sub-display driving circuit configured to generate the additional image;

a multiplexer configured to merge the main image with the additional image; and a source driver circuit and a gate driver circuit configured to drive the display panel.

17. The electronic device of claim 16, wherein the display driving circuit further comprises:

a first graphic random access memory (RAM) configured to store the main image data; and an image processor configured to convert the main image data.

18. The electronic device of claim 16, wherein the interface comprises:

a high speed interface configured to receive the main image data; and a low speed interface configured to receive a control signal from the at least one of the first integrated circuit or the second integrated circuit.

19. The electronic device of claim 16, wherein the display driving circuit further comprises:

a clock generator circuit configured to provide a clock signal to the sub-display driving circuit.

* * * * *